(12) United States Patent
Chaundhry et al.

(10) Patent No.: US 12,181,016 B2
(45) Date of Patent: Dec. 31, 2024

(54) SUPERELASTIC MULTI AXIS FLEXURE

(71) Applicant: Raytheon Company, Waltham, MA (US)

(72) Inventors: Zaffir A. Chaundhry, South Glastonbury, CT (US); Ulf Jonsson, East Hartford, CT (US); Jake B. Range, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 52 days.

(21) Appl. No.: 17/672,637

(22) Filed: Feb. 15, 2022

(65) Prior Publication Data
US 2023/0258222 A1    Aug. 17, 2023

(51) Int. Cl.
F16F 15/04    (2006.01)

(52) U.S. Cl.
CPC .......... F16F 15/04 (2013.01); *F16B 2200/77* (2023.08)

(58) Field of Classification Search
CPC .......... F16F 15/04; F16F 15/08; F16F 15/085; F16B 2200/77
USPC ....... 248/605, 606, 618, 619, 621, 560, 564, 248/565, 603
See application file for complete search history.

(56) References Cited

U.S. PATENT DOCUMENTS

| | | | | |
|---|---|---|---|---|
| 1,435,763 A * | 11/1922 | Townsend | ............... | F21V 15/04 248/603 |
| 1,491,736 A * | 4/1924 | Polk | ..................... | F04D 29/646 248/603 |
| 1,541,754 A * | 6/1925 | Spreen | ..................... | F25B 31/00 248/603 |
| 1,786,203 A * | 12/1930 | Gilbert | ..................... | F24F 7/013 248/603 |
| 2,941,777 A * | 6/1960 | Aller | ..................... | F16F 15/067 248/619 |
| 3,773,285 A * | 11/1973 | Morrill | ................. | F04D 29/668 244/230 |
| 4,043,708 A * | 8/1977 | Greenfield | ............ | F04D 29/646 165/122 |
| 4,190,227 A * | 2/1980 | Belfield | .................... | F16F 7/14 248/618 |
| 4,511,115 A * | 4/1985 | Ludwigsen | ............. | B63B 35/44 248/580 |
| 4,572,471 A * | 2/1986 | Schrepfer | ............. | F16F 15/073 248/560 |
| 4,860,507 A * | 8/1989 | Garza-Tamez | .......... | E02D 27/34 248/560 |
| 4,870,552 A * | 9/1989 | Vitta | ....................... | F21V 21/06 362/369 |

(Continued)

*Primary Examiner* — Christopher Garft
*Assistant Examiner* — Michael McDuffie
(74) *Attorney, Agent, or Firm* — CANTOR COLBURN LLP

(57) ABSTRACT

A multi-axis payload isolation device for isolating a payload from outside motions. The multi-axis payload isolation device includes a payload mount base, a housing, and a flexure. The payload mount base is configured to support a payload. The housing includes an interior cavity for receiving and supporting the payload mount base. The flexure includes a plurality of radial supports and a common hub. The plurality of radial supports attach the payload mount base to the housing and are made of a superelastic shape-memory alloy. The common hub is configured to connect each of the plurality of radial supports to the payload mount base.

22 Claims, 18 Drawing Sheets

(56) References Cited

U.S. PATENT DOCUMENTS

| | | | | |
|---|---|---|---|---|
| 5,280,889 | A * | 1/1994 | Amil | F41H 5/266 |
| | | | | 248/618 |
| 6,068,821 | A * | 5/2000 | VanDeGraaf | G12B 9/08 |
| | | | | 422/403 |
| 6,530,564 | B1 | 3/2003 | Julien | |
| 6,997,446 | B2 * | 2/2006 | Hall | F16F 1/025 |
| | | | | 433/118 |
| 7,458,172 | B2 | 12/2008 | Aveni | |
| 10,962,075 | B2 | 3/2021 | Dubost et al. | |
| 11,047,370 | B1 * | 6/2021 | Koehler | B63B 22/003 |
| 11,649,870 | B2 * | 5/2023 | Gilmore | F16F 3/12 |
| | | | | 267/136 |
| 11,686,361 | B2 * | 6/2023 | Gilmore | B60N 2/54 |
| | | | | 248/560 |
| 2004/0025985 | A1 | 2/2004 | van Schoor et al. | |
| 2007/0176073 | A1 * | 8/2007 | Simic | G06F 3/0395 |
| | | | | 248/618 |
| 2011/0226929 | A1 * | 9/2011 | Hiley | F16M 11/14 |
| | | | | 248/618 |
| 2015/0014510 | A1 * | 1/2015 | Dunning | F16F 3/026 |
| | | | | 248/618 |
| 2023/0258223 | A1 | 8/2023 | Chaundhry et al. | |

* cited by examiner

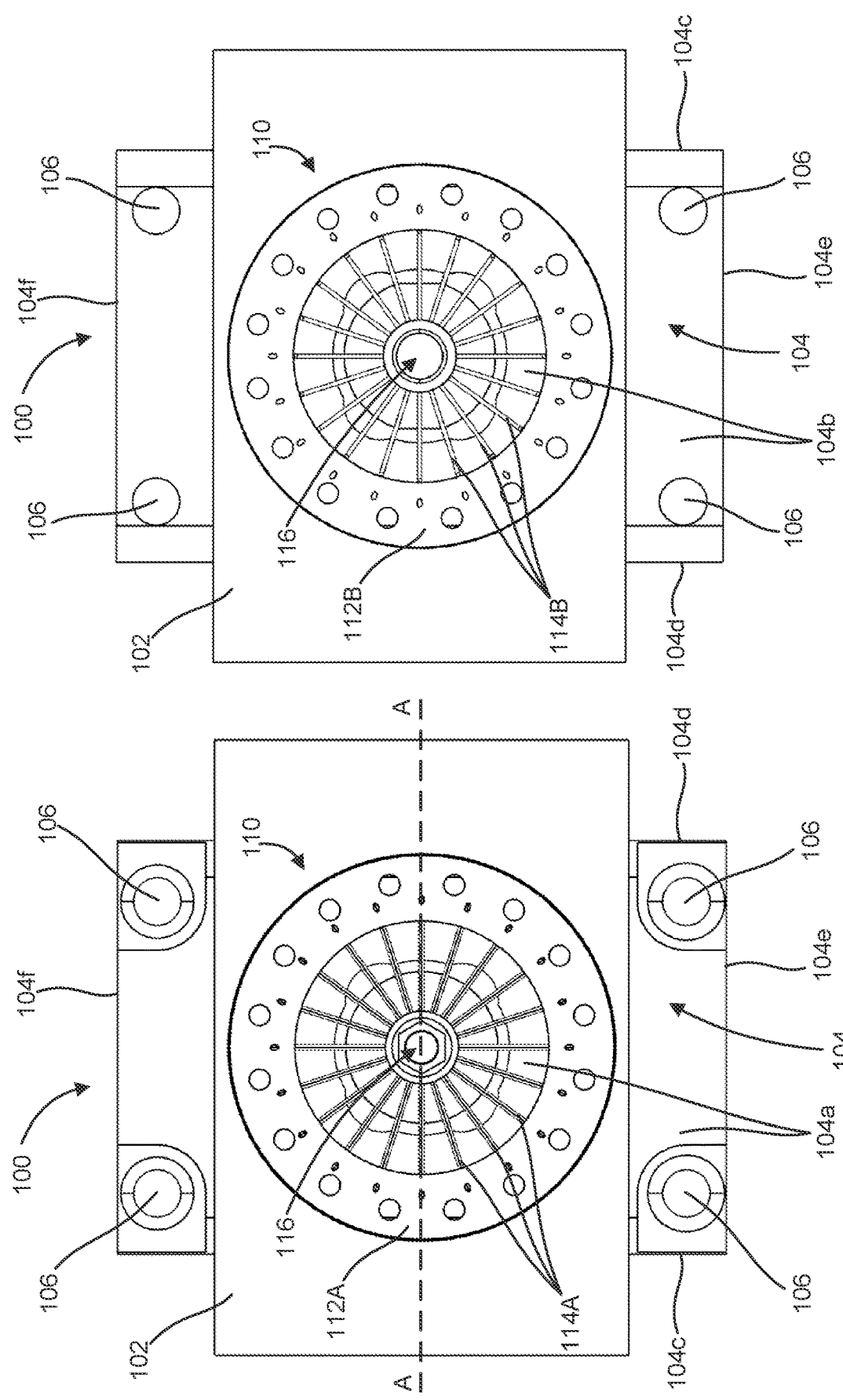

SUPERELASTIC MULTI AXIS FLEXURE

BACKGROUND

Sensors, cameras, and other mapping, imaging, and/or data collecting devices, as well as other devices, objects or systems (these being referred to as payloads) are often utilized in applications where these may be subject to large impact loads and/or vibrations. For example, various sensors and data collecting devices are sometimes mounted on moving vehicles, such as land/water vehicles, aircraft, during collection of data. Therefore, the sensors and associated sensor mounts can be subject to high impact loads due to turning, turbulence, bumps, shocks, and/or acceleration and deceleration acting on the moving vehicle. To better isolate the sensors from linear, rotational, and/or translational accelerations and attitude changes from outside forces and control movements on vehicles, the sensors are often mounted to the moving vehicles using multi-axis flexures or rotational isolators that act to isolate the sensors from unwanted movements that would otherwise propagate to the sensor and result in reduced performance of the sensor. However, semi-regular failure of multi-axis flexures and rotational isolators used as sensor mounts continues to be a persistent problem that can lead to increased costs, increased frequency of repairs, and significant downtime for mounted sensors and associated vehicles used for data collection. Generally speaking, other payloads besides sensors can be subject to similar high impact loads and experience similar problems.

In addition, there is a desire to create flexures and rotational isolators that can be used in systems that are larger than those that are currently used. The goal for multi-axis flexures is to have a relatively low rotational stiffness and a high translation stiffness, while still being able to absorb and mitigate vibrations and loads without failure of the flexure. However, current flexure and rotational isolator designs are not favorable to scaling up. This is because as the size of a flexure is increased, it has been observed that the rotational stiffness increases by approximately, for example, a power of three or a power of four, depending on the material but tensile strength only increases by approximately, for example, a power of two and the system mass increases approximately with the power of three. Accordingly, larger flexures become undesirable stiff rotationally as well as losing tensile strength and ability to absorb impact loads. Therefore, larger current flexures are subject to failure at a higher rate than their smaller counterparts and provide undesired amounts of rotational stiffness. Therefore, In order to reduce failure of flexure mounts used to support sensors and other payloads, alternative designs and configurations of flexures continue to be researched and developed.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 3A and 3B respectively illustrate top and bottom views of the multi-axis payload isolation device of FIG. 1.

Figure 1:
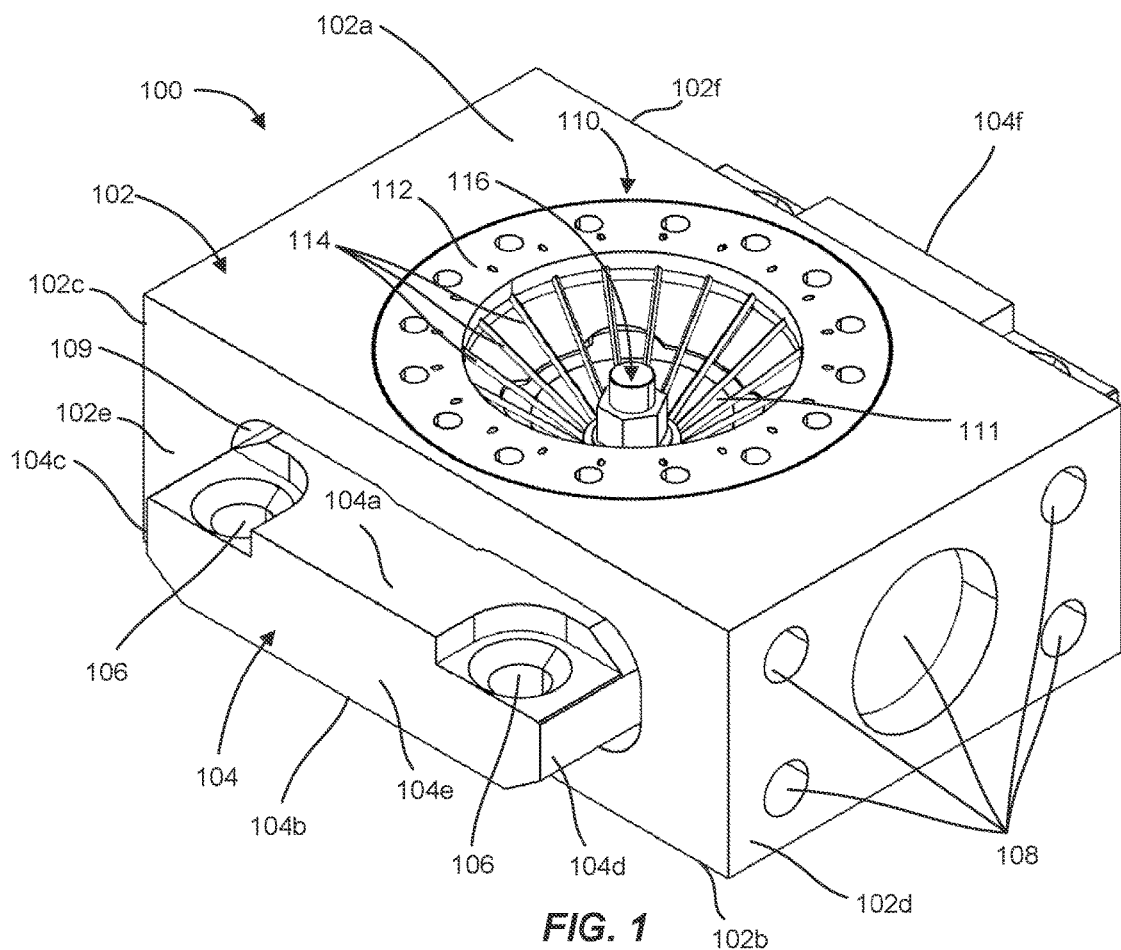
FIG. 1 illustrates an isometric view of a multi-axis payload isolation device in accordance with at least one example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is a multi-axis payload isolation device for isolating a payload from outside vibrations. The device can include a payload mount base configured to support the payload. The device can further include a housing including an interior cavity for receiving and supporting the payload mount base. The device can further include a flexure. The flexure can include a plurality of radial supports made of a superelastic shape-memory alloy that attach the payload mount base to the housing, and a common hub configured to connect each of the plurality of radial supports to the payload mount base.

Further disclosed herein is a multi-axis payload isolation system. The system can include a payload and a multi-axis payload isolation device for isolating a payload from outside vibrations. The device can include a payload mount base configured to support the payload. The device can further include a housing including an interior cavity for receiving and supporting the payload mount base. The device can further include a flexure. The flexure can include a plurality of radial supports made of a superelastic shape-memory alloy that attach the payload mount base to the housing, and a common hub configured to connect each of the plurality of radial supports to the payload mount base. The payload can be attached to the payload mount base.

To further describe the present technology, examples are now provided with reference to the figures. Illustrated in the figures are examples of multi-axis payload isolation devices that utilize shape memory alloys to provide improved shock absorption and reduced failure over current flexures. With reference to FIG. 1, illustrated is a multi-axis payload isolation device 100 operable with a payload to form a multi-axis payload isolation system in accordance with an example of the present disclosure. As shown in FIG. 1, the multi-axis payload isolation device 100 can comprise a housing 102 and a payload mount base 104. The payload mount base 104 can comprise an upper surface 104a, a lower surface 104b opposite to the upper surface 104a, side surfaces 104c and 104d that are perpendicular to the upper surface 104a and the lower surface 104b, and a front surface 104e and a rear surface 104f that are perpendicular to the surfaces 104a, 104b, 104c, and 104d. The payload mount base 104 can be configured to support a sensor (not shown) mounted thereon via holes 106. The housing 102 can include one or more side surfaces 102c and 102d that can act as mounting surfaces having one or more mounting features 108 formed thereon. The mounting features 108 are configured to facilitate mounting the multi-axis payload isolation device 100 to an outside structure, for example a gimbal or other support structure via isolation bars for supporting the multi-axis payload isolation device 100. The shape, structure, and/or configuration of the mounting features 108 are not described in detail herein, and are not intended to be limited in any way by this disclosure. The mounting features 108 can be holes, projections, or other structures known for attaching structures to each other and can be formed on or otherwise supported by the housing 102 in any position, number and/or configuration.

The payload mount base 104 can be supported and suspended in position in an interior cavity 109 defined by the housing 102. The payload mount base 104 can be supported and suspended in the interior cavity 109 via a multi-axis flexure 110 configured to be attached to the housing 102 and the payload mount base 104. The multi-axis flexure 110 can be configured to be attached to the housing 102 at an opening 111 formed in the housing 102. The flexure 110 can include an anchor ring 112 configured to clamp, attach, and hold a plurality of radial supports 114 of the flexure 110 to the housing 102. The plurality of radial supports 114 of the flexure 110 can be radially disposed around the opening 111 formed in the housing 102 and can extend from the housing 102 toward the payload mount base 104 to attach to the payload mount base 104 at a central hub 116 configured to attach and hold each of the plurality of radial supports 114 to the payload mount base 104. Each of the radial supports 114 can be a spoke or spoke-like member used to support the payload mount base 104 from the housing 102.

Figure 2:
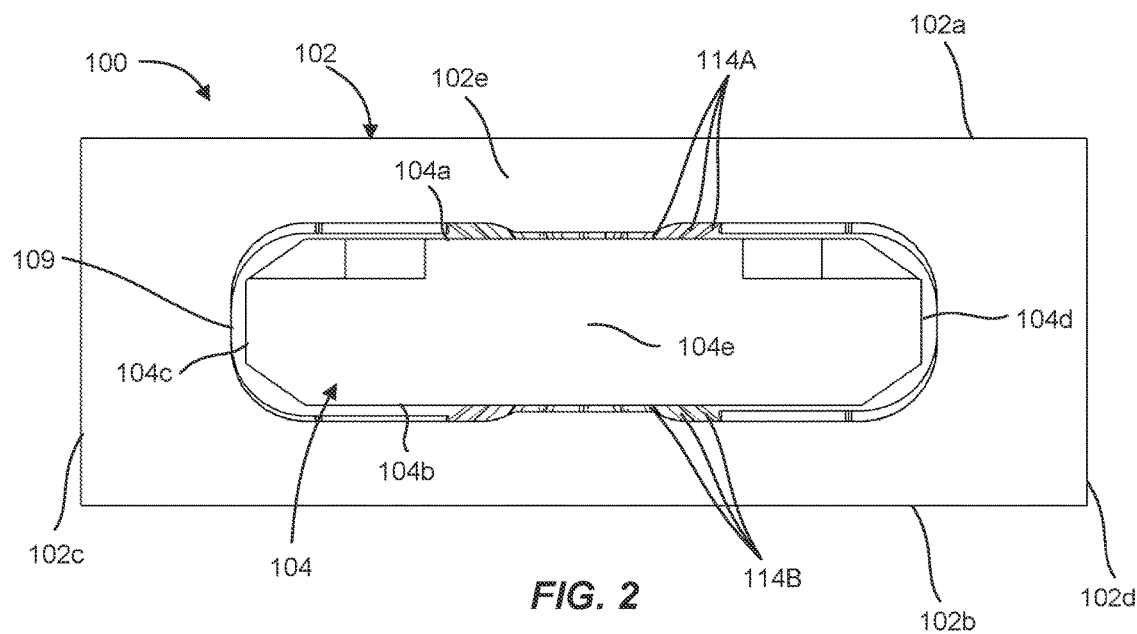
FIG. 2 illustrates a front view of the multi-axis payload isolation device of FIG. 1.

FIG. 2 illustrates a front view of the multi-axis flexure 100, including additional features of the flexure 100. As illustrated in FIGS. 1 and 2, the housing 102 can comprise a plurality of mounting surfaces including a first mounting surface 102c and a second mounting surface 102d disposed on a surface of the housing 102 opposite to the first mounting surface 102c. Each of the first and second mounting surfaces 102c and 102d can include one or more mounting features for attaching the flexure device 100 to another structure. In addition, the payload mount base 104 can be suspended and supported within the interior cavity 109 of the housing 102. The payload mount base 104 can be supported from one or more directions that can include both from the top surface 102a and bottom 102b of the housing 102 (using FIG. 2 as a reference for direction). For example, a first plurality of radial supports 114A can support and suspend the payload mount base 104 from a top 102a of the housing 102 and a second plurality of radial supports can support the payload mount base 104 from a bottom surface 102b of the housing 102.

FIG. 3A illustrates a top view of the multi-axis payload isolation device 100 and FIG. 3B illustrates a bottom view of the multi-axis payload isolation device 100. As shown in FIGS. 1-3A, a top portion of the flexure 110 can include a first anchoring ring 112A for clamping a first plurality of radial supports 114A to an upper portion of the housing 102. The first plurality of radial supports 114A can be connected to the central hub 116, which connects the first plurality of radial supports 114A to the payload mount base 104. As further shown in FIG. 3A, a bottom portion of the flexure 110 can include a second anchoring ring 112B for clamping a second plurality of radial supports 114B to a bottom portion of the housing 102. The second plurality of radial supports 114B can be connected to the central hub 116, which connects the second plurality of radial supports 114B to the payload mount base 104. The connection of each of the pluralities of radial supports 114A and 114B to the housing 102 and the payload mount base 104 will be described in more detail with reference to FIG. 8 below.

FIGS. 4A-4D illustrate views of the payload mount base 104, the housing 102, and the payload mount base 104 being inserted into and disposed in the housing 102. As illustrated in FIGS. 1-4A, the payload mount base 104 can include a plurality of holes 106 formed therein, for example, at corners of the payload mount base 104. The holes can be configured to receive mounting protrusions or fasteners to mount a sensor or other payload to the payload mount base 104. The sensor or other type of payload that can be mounted to the payload mount base 104 is not described in detail herein, and is not intended to be limited in any way by this disclosure. Indeed, the payload that can be mounted on or otherwise supported by the payload mount base 104 can be any suitable type of device or system as will be apparent to those skilled in the art, such as any sensor, camera, microphone, mapping device, tracking device, communication device, transmitter, receiver, or any other device or system, or combination of devices or systems.

Figure 4A:
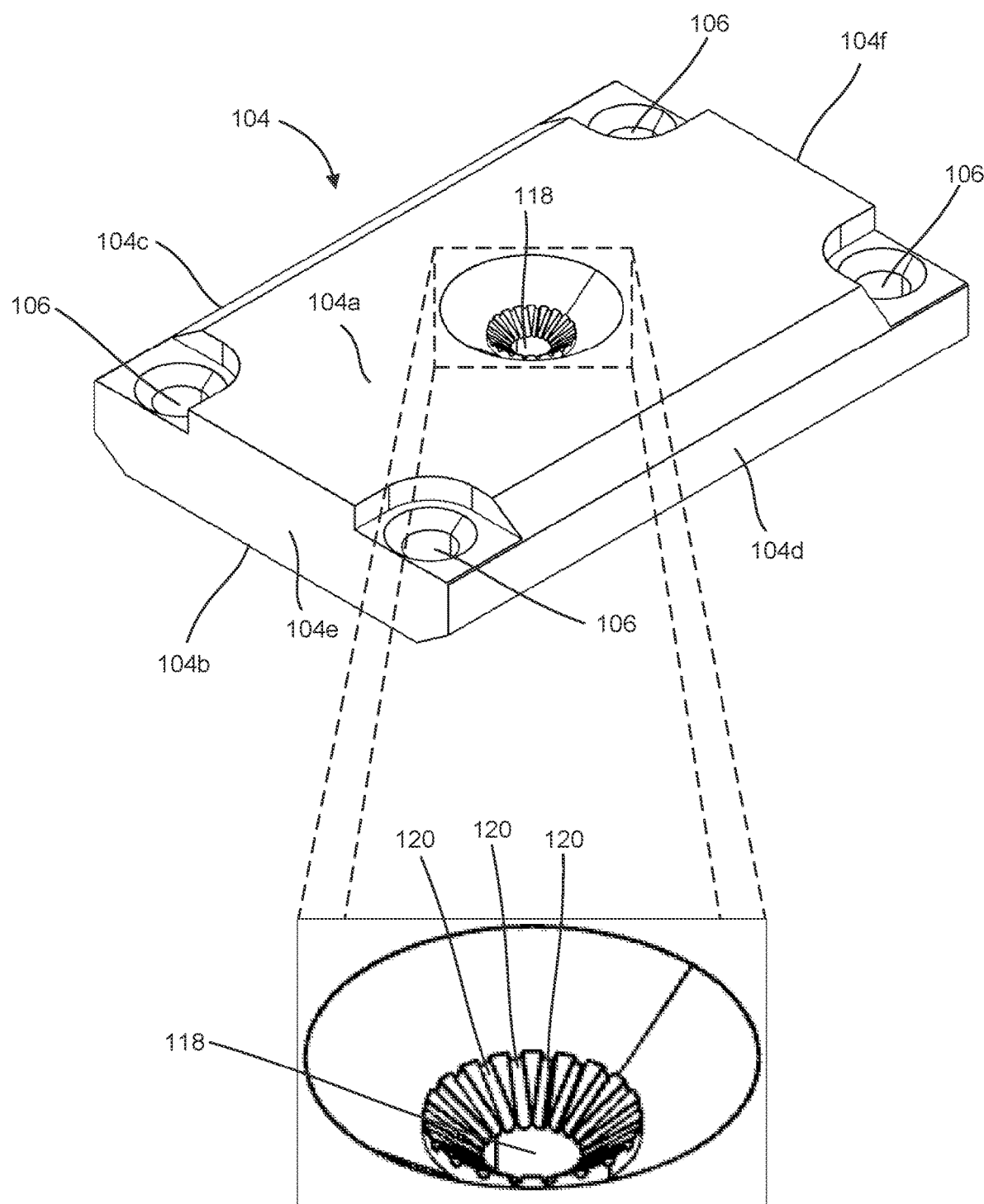
FIGS. 4A-4D illustrate views of a payload mount base and a housing of the multi-axis payload isolation device of FIG. 1 in various configurations according to at least one example of the present disclosure.

Furthermore, the payload mount base 104 can include an opening 118 formed through the payload mount base 104 extending from a top surface 104a of the payload mount base 104 to a bottom surface 104b of the payload mount base 104 (using FIG. 4A as a reference for direction). A zoomed-in enlarged image of the opening 118 is also shown in FIG. 4A to illustrate further details of the opening 118. As shown, the opening 118 can include a frustoconical shape or configuration. The opening 118 can receive the multi-axis flexure 110 that will be described in further detail below. A plurality of grooves 120 can be formed in the payload mount base 104 radially around the opening 118. Each of the grooves 120 can be configured to receive, support, and/or constrain movement of a radial support of a plurality of radial supports of the multi-axis flexure 110. Although not shown in FIG. 4A, it is to be understood that the opening 118 formed in both the top and bottom surfaces 104a and 104b surfaces of the payload mount base 104 can include at least two frustoconical shapes that are inverted relative to one another and that are formed or positioned adjacent one another. In other words, while only one frustoconical shape of a portion of the opening 118 in the top surface 104a is shown in FIG. 4A, it is to be understood that a similar frustoconical shape is also formed in a portion of the opening 118 on the bottom surface 104b of the payload mount base 104. For simplicity, each of the frustoconical shapes will be referred to as "cones" including an upper cone formed in an upper surface of the payload mount base 104 and a lower cone formed in a lower surface of the 1. The upper and lower cones can meet at the opening 118 formed in the payload mount base 104. Both an upper cone (e.g., formed in the top surface 104a of payload mount base 104) and the lower cone (e.g., formed in the bottom surface 104b of payload mount base 104) can include a plurality of grooves 120 for receiving, supporting, and/or constraining movement of one or more of the plurality of radial supports 114A and/or 114B of the multi-axis flexure 110.

Figure 4B:
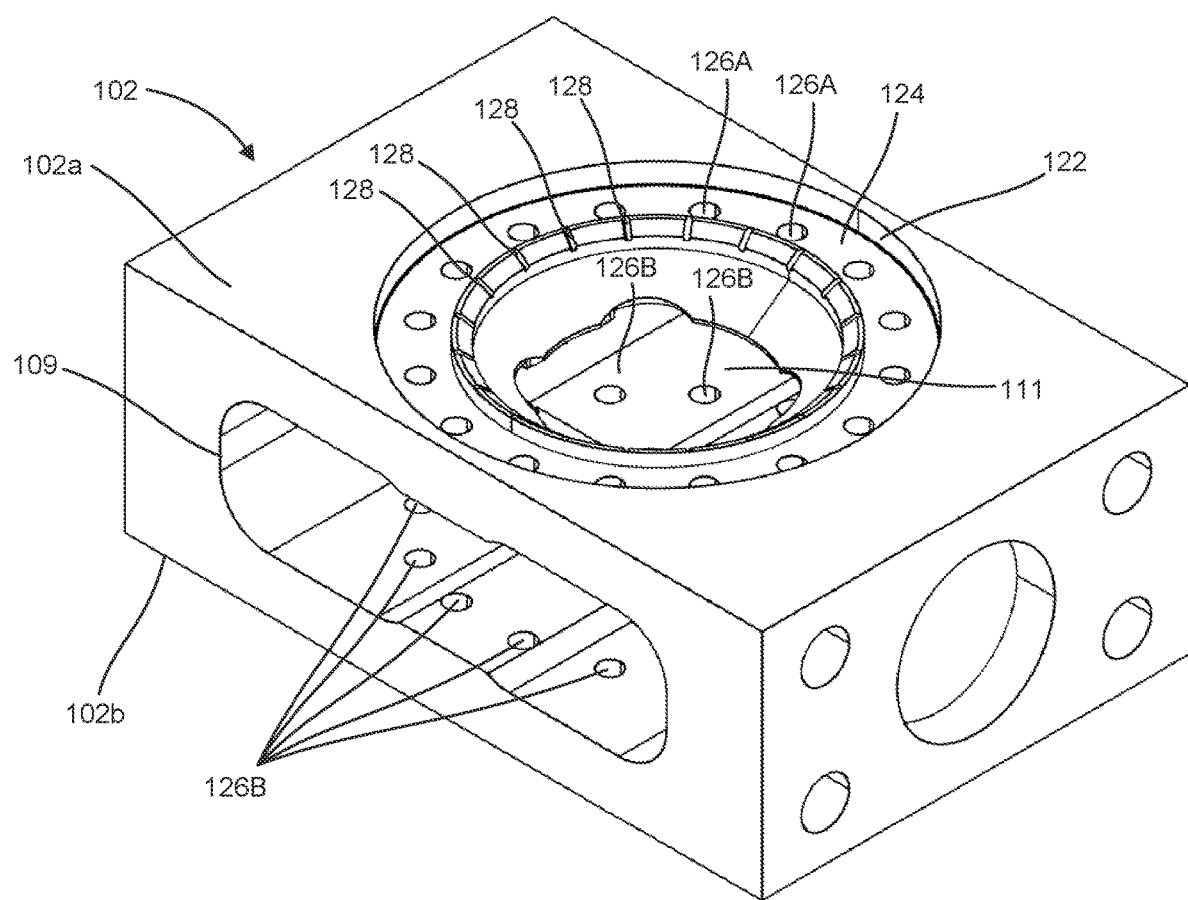

With reference to FIGS. 1-4B, wherein FIG. 4B illustrates an isometric view of the housing 102, the interior cavity 109 can be formed through the housing 102 in a first direction, and can be configured to receive the payload mount base 104 therein. An opening 111 can be formed through the housing 102 to be in communication with the interior cavity 109. Various features can be formed in the housing 102 to surround the opening 111 in order to facilitate coupling of the multi-axis flexure 110 to the housing 102. For example, a recess 122 can be formed in the housing 102 having a surface 124 configured to receive and support an anchoring ring 112A or 112B. The anchoring ring 112A or 112B can be seated within the recess 122, and can be attached to the housing 102 at surface 124 using fasteners or other coupling means inserted into holes 126A radially spaced around the opening 111. Indeed, the anchoring ring 112A or 112B can be attached to the housing by an adhesive, by welding, or by any known method of attaching structures together. The method of attaching the anchoring ring 112A or 112B to the housing 102 is not intended to be limited in any way by this disclosure. A plurality of grooves 128 can be formed radially spaced around the opening 111. Each groove of the plurality of grooves 128 can receive, support, and constrain movement of one of a plurality of radial supports of the multi-axis flexure 110. Although not shown in FIG. 4B, it is to be understood that a recess similar to recess 122 including surfaces, grooves, holes 126B a, such that an anchoring ring of anchoring rings 112A and 112B can be received and supported on both a top 102a and bottom 102b of the housing 102.

Figure 4C:
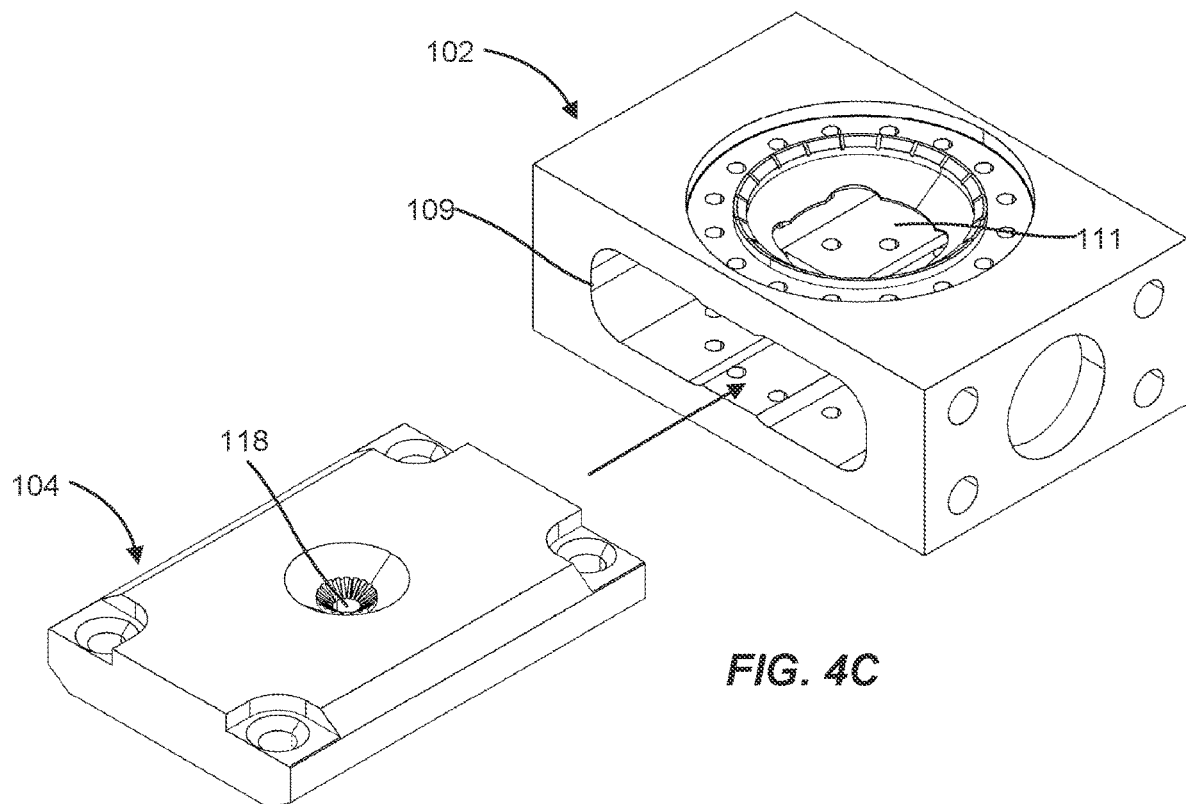
Figure 4D:
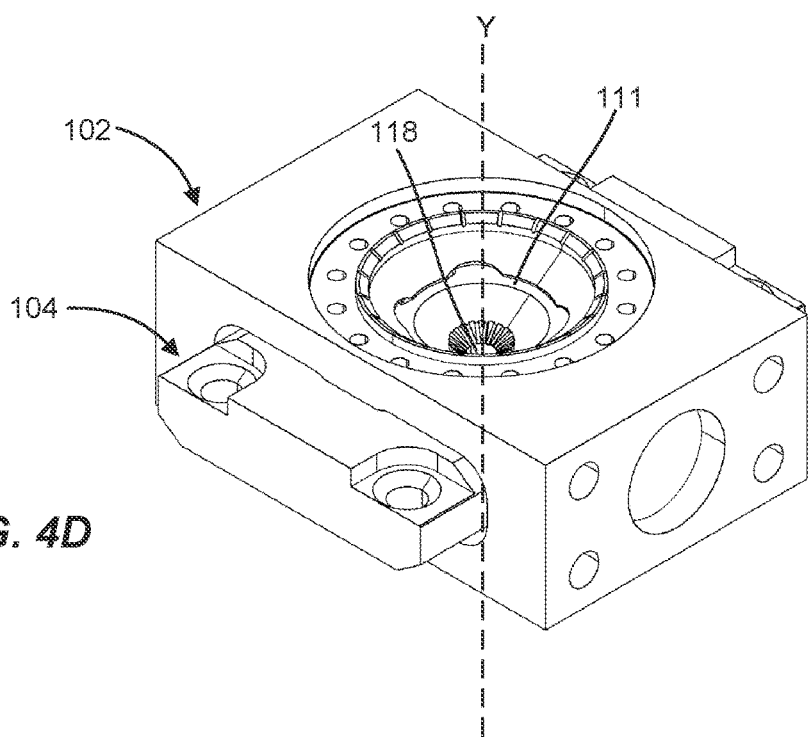

FIG. 4C illustrates the payload mount base 104 being inserted into the interior cavity 109 of the housing 102. The payload mount base 104 can be inserted into the interior cavity 109 and positioned a point where the opening 118 of the payload mount base 104 aligns with the opening 111 of the housing 102. As shown in FIG. 4D, the payload mount base 104 can be fully inserted into the interior cavity 109 of the housing 102 such that the opening 118 of the payload mount base 104 is substantially aligned with the opening 111 of the housing 102 along an axis Y.

Figure 5A:
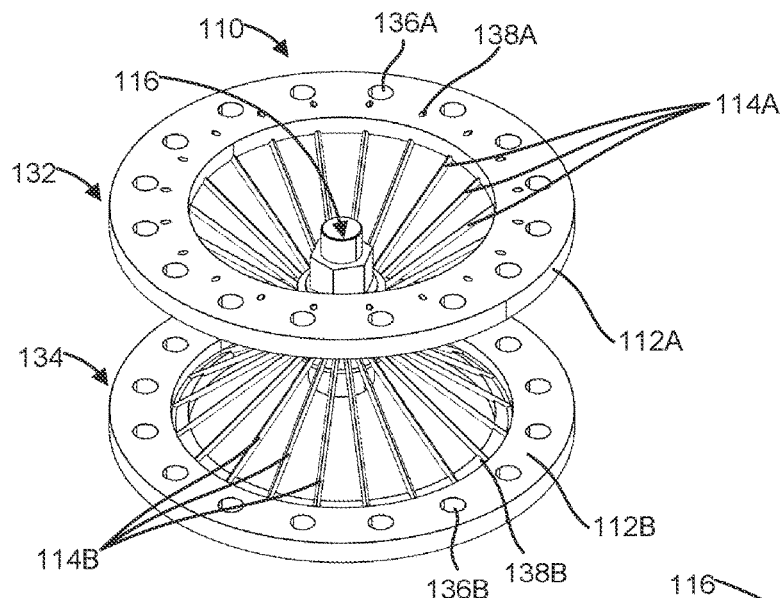
FIGS. 5A, 5B, and 5C respectively illustrate isometric, top, and front views of a flexure of the multi-axis payload isolation device of FIG. 1.
Figure 5B:
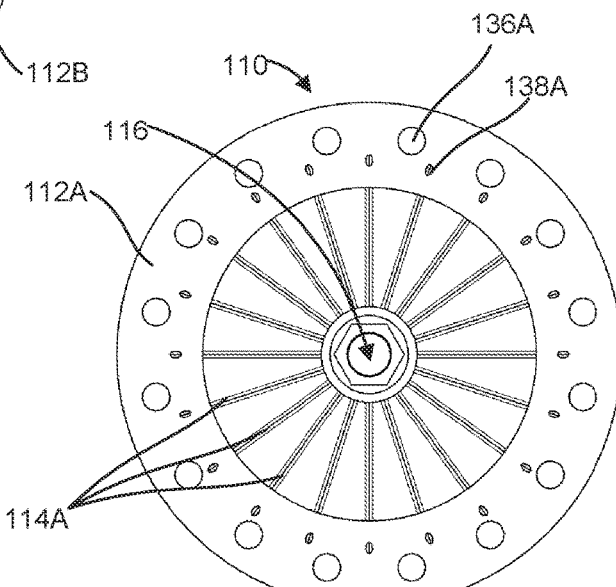
Figure 5C:
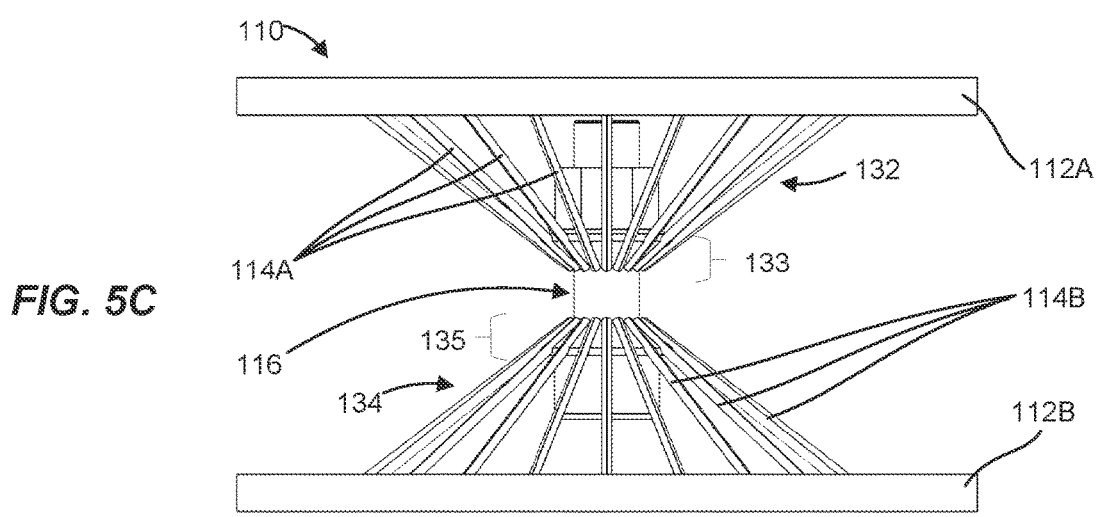

FIGS. 5A-5C illustrate various views of the multi-axis flexure 110 of the multi-axis payload isolation device 100, wherein the multi-axis flexure 110 can be configured to interface with the housing 102 and the payload mount base 104 of the multi-axis payload isolation device 100. As shown in FIGS. 1-5C, flexure 110 can comprise two frustoconical flexures 132 and 134 that are each connected to the central hub 116. Each of the frustoconical flexures 132 and 134 can include an anchoring ring (e.g., see anchoring rings 112A and 112B). A plurality of radial supports 114A can interface with the anchoring ring 112A of the first frustoconical flexure 132 by being disposed in one of a plurality of cavities 138A formed radially around the anchoring ring 112A to receive and support each radial support of the plurality of radial supports 114A. Each of the plurality of radial supports 114A can extend from the anchoring ring 112A to a first common hub 133 of central hub 116 and can interface with the first common hub 133, as will be described later with respect to FIGS. 6-8. A plurality of radial supports 114B can interface with the anchoring ring 112B of the second frustoconical flexure 134 by being disposed in one of a plurality of cavities 138B formed radially around the anchoring ring 112B to receive and support each radial support of the plurality of radial supports 114B. Each of the plurality of radial supports 114B can extend from the anchoring ring 112B to a second common hub 135 of the central hub 116 and can interface with the second common hub 135, as will be described later with respect to FIGS. 6-8. The anchoring rings 112A and 112B can each be attached to the housing 102 via fasteners inserted through holes 136A and 136B formed in the anchoring rings and holes 126 formed in the interface surface 124 of the housing, or any other known method of attachment.

It is noted that the multi-axis flexure 110 described herein (see particularly FIGS. 5A-5C) can be used with any type of device or system as will be apparent to those skilled in the art. As such, the multi-axis flexure 110 as used with the housing 102 and the payload mount base 104 of the multi-axis payload isolation device 100 as described herein is merely one example application, which application is not intended to be limiting in any way. Indeed, other suitable applications may exist in which the multi-axis flexure 110 can be incorporated or implemented. This is also applicable to the flexures 702, 704, 706 and/or 708 shown in FIGS. 17-18C, and described below.

In the flexures described herein, each of the radial supports of the plurality of radial supports 114A and 114B can be formed of a superelastic (also known as pseudoelastic) shape-memory alloy, such as Nitinol (NiTi), copper-aluminum-nickel (CuAlNi), copper-aluminum (CuAl), shape memory alloys made from alloying together two or more of zinc, copper, gold, manganese, silver, cadmium, cobalt, gallium, beryllium, zirconium, chromium, gadolinium, hafnium, tin, platinum, palladium, niobium, and silicon, or any other superelastic and/or shape-memory alloy.

Traditional rotational isolators and rotational isolation flexures are often made with super high strength steels and other materials. The high strength steel in the geometries of traditional rotational isolators, and if used in the geometries described in the present application, offers low translational flexibility (e.g., high translational stiffness) to decouple the rotational isolator from any separately tunable translational isolator. Decoupling rotational isolation from translational isolation can allow for more easy and accurate measurement of the angle delta across the flexure for potential use in servo applications. This adequately limits rotational acceleration inputs to the payload induced by vibration (with CG offset) or external rotational accelerations and impact effects on sensors attached to such flexures. However, such flexures often fail regularly after excessive loads or shock loads due to their inherently and intentionally high translational stiffness. The lack of flexibility and elasticity in high-strength steel materials, as well as flexures made of such materials, often cause failures of the flexures under high impact loads. Additionally, high strength steel flexures are not easily scaled up for use in larger applications due to a scaling relation of rotational stiffness in scaled-up flexures and a scaling relation of tensile strength in scaled-up flexures. For example, as a scaling of a flexure increases, it has been observed that the rotational stiffness for the flexure made of high-strength steel increases by a power of three. However, tensile strength increases by a power of two and the system weight increased with a power of three. Accordingly, as the steel flexure is scaled up the increased tensile strength does not increase at the same rate as the rotational stiffness. Accordingly, a ratio of strength to flexibility of a flexure decreases as the size of the flexure increases.

Using shape-memory alloys for the radial supports in flexure 110 and multi-axis payload isolation device 100 gives improved support and isolation to sensors and other payloads mounted to the multi-axis payload isolation device 100. Shape memory alloys further offer improved rotational isolation as well as improved handling and absorption of shock loads that impact the flexure device and mounted sensors. By replacing the current super high strength flexures formed of steels with flexures formed of superelastic alloys, such as Nitinol, and configured as described herein, such flexures will have sufficient rotational flexibility to allow rotational motion during operation of sensors or other payloads mounted to the flexure while having sufficient translation stiffness to be able to handle nominal operational loads. The superelastic flexure temporarily stretches in translation directions limited by hard stops during shock impacts. Additionally, after stretching out under the shock load, the supereleastic radial supports can then return to original shape and configuration due to the superelastic and other material properties of the radial supports. In other words, the shape memory alloys facilitate sufficient flexibility in the rotational direction to allow rotational flexibility during operation, but also have sufficient tensile strength to provide accurate translational positioning during normal operation. The translational stiffness of the radial supports allows temporary translational movement of the flexure to absorb shock loads without failing. In other words, the superelastic radial supports have a much higher maximum displacement under a similar shock load before yielding or reaching ultimate failure of the shape memory alloy material when compared to other materials. Accordingly, the system's hard stops can be reached before failure of the structure. Superelastic shape-memory alloy materials can be used to improve the energy absorption of mechanical components used in structures subjected to impact loads.

By way of further description, shape memory alloys are metal alloy materials that have the ability to return to a complex original shape even after being deformed by extreme amounts. The superelasticity and shape memory of shape memory alloys are achieved by the unique microstructures and phases of shape memory alloys. Shape memory alloys have three different microstructures that exist in two different phases, with the phase present in the shape memory alloy being dependent on the temperature and the amount of stress applied to the shape memory alloy. The two phases of shape memory alloys are known as martensite and austenite. The martensite phase generally exists at lower temperatures. The austenite phase generally exists at higher temperatures. Within the two phases, the shape memory alloy can exist in different microstructures associated with the austenite and martensite phases (e.g., austenite, twinned martensite, and detwinned martensite crystal structures).

The transition between austenite and martensite phases is dependent on temperature and stress, not time. A heated shape memory alloy changes from the austenite phase to the martensite phase upon cooling. For purposes of discussion $M_s$ and $M_f$ are the respective temperatures at which the transition from austenite to martensite starts and finishes upon cooling of the shape memory ahoy. Similarly, during heating $A_s$ and $A_f$ are the temperatures at which the transformation from martensite to austenite of a shape memory alloy starts and finishes. The $M_s$ temperature at which austenite transitions to martensite when cooling the shape memory alloy can be higher than the $A_s$ temperature at which martensite transitions to austenite when heating the shape memory alloy. In other words, temperatures at which the shape memory alloys transitions between martensite and austenite phases can be different depending on whether the alloy is being heated or cooled and depending on in which direction (i.e., martensite to austenite, or austenite to martensite) the transition is occurring.

Shape memory alloys possess material properties that work together to provide shape memory effects to the alloy. For example, shape memory alloys include an austenite to martensite transition as the shape memory alloy cools. This transition is a solid-to-solid phase transition from an austenite phase (when the shape memory alloy is at a relatively high temperature) to a martensite phase (when the shape memory alloy is at a relatively low temperature). The austenite phase has an austenite crystal structure with high symmetry, such as a cubic molecular structure. The martensite phase has a martensite crystal structure with lower symmetry, such as tetragonal, orthorhombic, or monoclinic structures.

The low-symmetry martensite structure has an ability to be deformed by twin boundary motion. Twin boundary motion is explained as follows. In the initial martensite phase after cooling, the shape memory alloy can retain the overall shape of the alloy when in the austenite phase. However, on an atomic level, the shape memory alloy can have a different crystal structure in the martensite phase then in the austenite phase, even though the overall outward shape remains the same in both phases. The crystal structure of the martensite can be a twinned martensite crystal structure comprising a twin boundary. The twin boundary is a two-dimensional defect in which the stacking of atomic planes of the lattice are mirrored across the plane of the twin boundary in a tetragonal, orthorhombic, or monoclinic structure. The twinned martensite structure provides an easy path for deformation when applying stresses to the materials. Applying the stress "detwins" the martensite to a detwinned martensite structure in which all of the atoms of the structure can move without changing the positions of atoms relative to other nearby atoms. In other words, no atomic bonds are broken or reformed as they would be by typical dislocation deformation of materials. If the twin boundary of twinned martensite is mobile, as in certain martensite structures, the motion of the twin boundary can cause the crystal to rearrange and thus accommodate strain.

Therefore a piece of shape memory alloy that is in the form of a coiled spring in the heated austenite phase can be deformed to a shape other than the coiled spring when the material is in the cooled martensite phase. However, because no atomic bonds are broken or reformed in the deformation and all of the atoms stay in the same position relative to other nearby atoms, the deformed martensite shape memory alloy remains close to the original austenite crystal structure. Thus, when the temperature of the shape memory alloy is raised to a transition temperature where austenite becomes thermodynamically favored over martensite and the deformed martensite phase transitions to the austenite phase, all of the atoms of the shape memory alloy rearrange to the austenite crystal structure, which happens to be the same macroscopic shape as the pre-deformation shape of the shape memory alloy. Accordingly, the piece of shape memory alloy that has been deformed when cooled, will return back to the original shape (e.g., coiled spring) when raised to trigger the phase transition to austenite.

Superelasticity (also known as pseudoelasticity) uses the same deformation mechanisms as shape memory, but occurs without a change in temperature. For example, as described above, shape memory alloys that are at a temperature above the $A_f$ temperature (at which the shape memory alloy exists at the austenite phase) are thermodynamically predisposed to return to the austenite crystal structure and the austenite phase. In other words, when shape memory alloys are held at or above the $A_f$ temperature, the shape memory alloys continually try to return to their original shape and structure. Therefore, the physical transformation and deformation of the shape memory alloy held above the $A_f$ temperature is induced by stress alone, not temperature. The applied stress can be large enough to overcome the natural driving force that keeps the material at equilibrium in the austenite phase. By applying stress to the material, the shape memory alloy can be converted into the martensite phase, and the crystal structure will strain to accommodate the applied stress. When this stress-energy is greater than the molecular driving force of stabilization in the austenite phase, the material will transform to the martensite phase and be subject to a large amount of strain. However, almost immediately when the stress is removed, the material can quickly return to its original shape in the thermodynamically-favored austenite phase, since martensite is not thermodynamically stable above the transition temperature in the absence of applied stress. Accordingly, shape memory alloys can be deformed by extreme amounts and quickly return to an original shape once stress is removed.

For impact resistance, strain energy absorption can be a useful metric for evaluating structural materials. The strain energy metric incorporates both the ductility and the strength of a material in one metric. For aerospace applications, density can also be considered. Dividing the strain energy by the density yields the specific strain energy. The specific strain energy of shape memory alloys compared to other common high performance structural materials shows that shape memory alloys can provide far better impact energy absorption then other materials. For example, when compared to 4130 steel, 2024-T4 aluminum, and a carbon fiber reinforced polymer (CFRP), the elastic energy absorbed by shape memory alloys (e.g., Nitinol) exceeds 4130 steel, 2024-T4 aluminum, and CFRP as a result of the superelasticity of the shape memory alloys. Furthermore, the total (elastic+plastic) energy absorbed by shape memory alloys such as Nitinol far exceeds that of 4130 steel, 2024-T4 aluminum, and CFRP. Shape memory alloys such as Nitinol's combination of strength and ductility can exceed that of 4130 steel, 2024-T4 aluminum, and CFRP by more than a factor of 5.

Furthermore, the strain capabilities of superelastic shape memory alloys add significant advantages to using shape memory alloys to absorb impact loads. For example, typical high-strength alloys and materials are often limited in absorbing impacts involving large ranges of motion because these materials have strain limits of only a few milli-strain. In contrast, shape memory alloys used in applications involving super plastic deformation can have strain that go up to 80 milli-strain or more. To absorb the high shock loads, the shape memory alloys can operate in super plastic behavior on a stress strain curve, but can quickly return to linear elastic behavior to return to their original shape due to super elasticity. In other words, in normal operation in a flexure, shape memory alloys may operate as linear elastic to isolate and absorb small vibrations and motions in regular operation of a flexure and may temporarily operate as superelastic when absorbing large loads and motions to absorb shock without failing or permanently deforming the shape memory alloys. Shape-memory alloys are advantageously used to absorb these impacts because the shape-memory alloys have a high level of recoverable plastic strain that can be induced. The recoverable strain shape memory alloys can hold without permanent damage is up to 8% for some alloys. This compares with a maximum strain 0.5% for conventional steels. Therefore, shape memory alloys can accommodate large impact loads and large motions without failing. Accordingly, shape memory alloys can provide far greater impact absorption and isolation then conventional materials currently used to make flexures.

Figure 6:
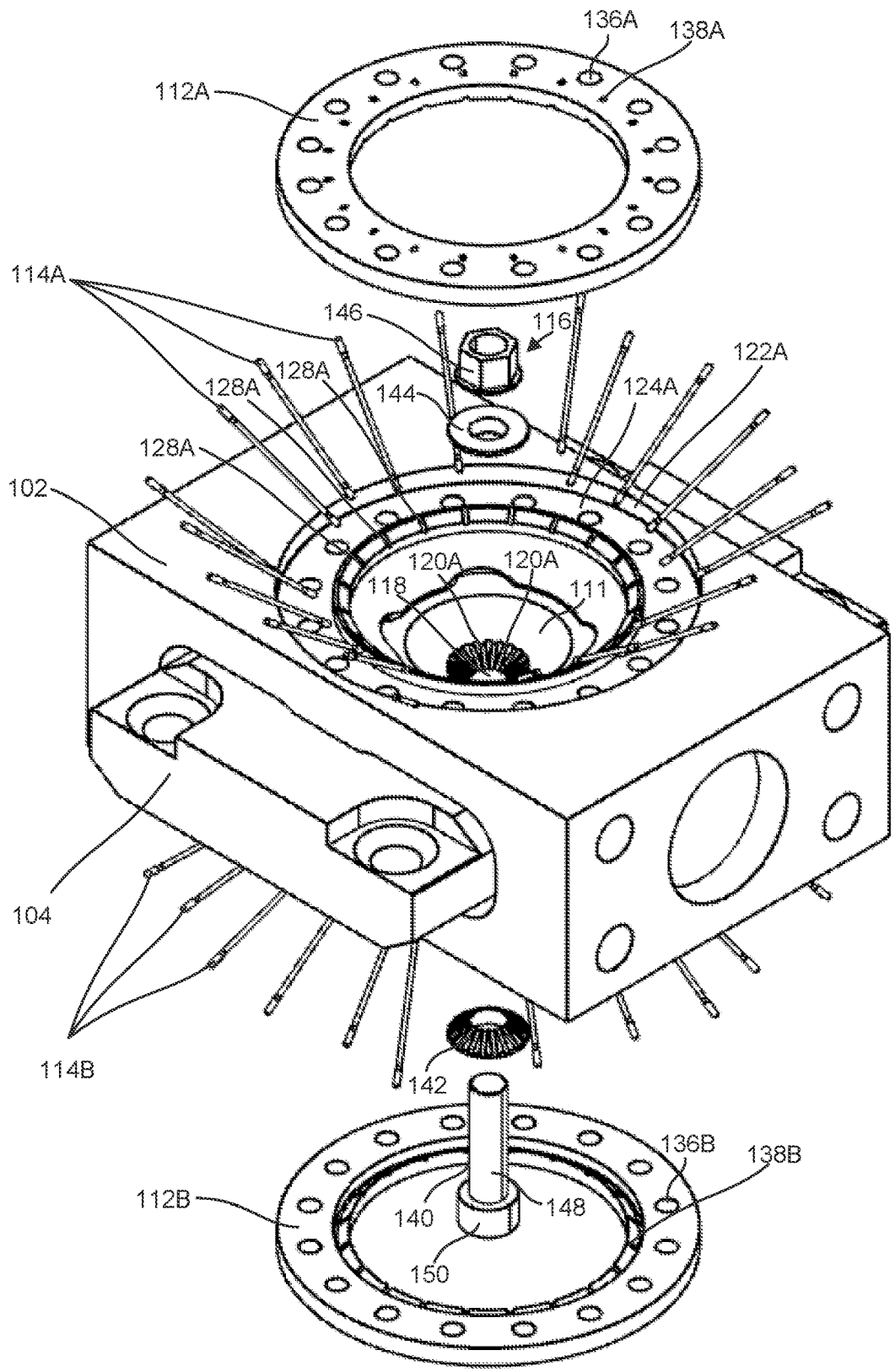
FIG. 6 illustrates an isometric exploded view of the multi-axis payload isolation device of FIG. 1.
Figure 7:
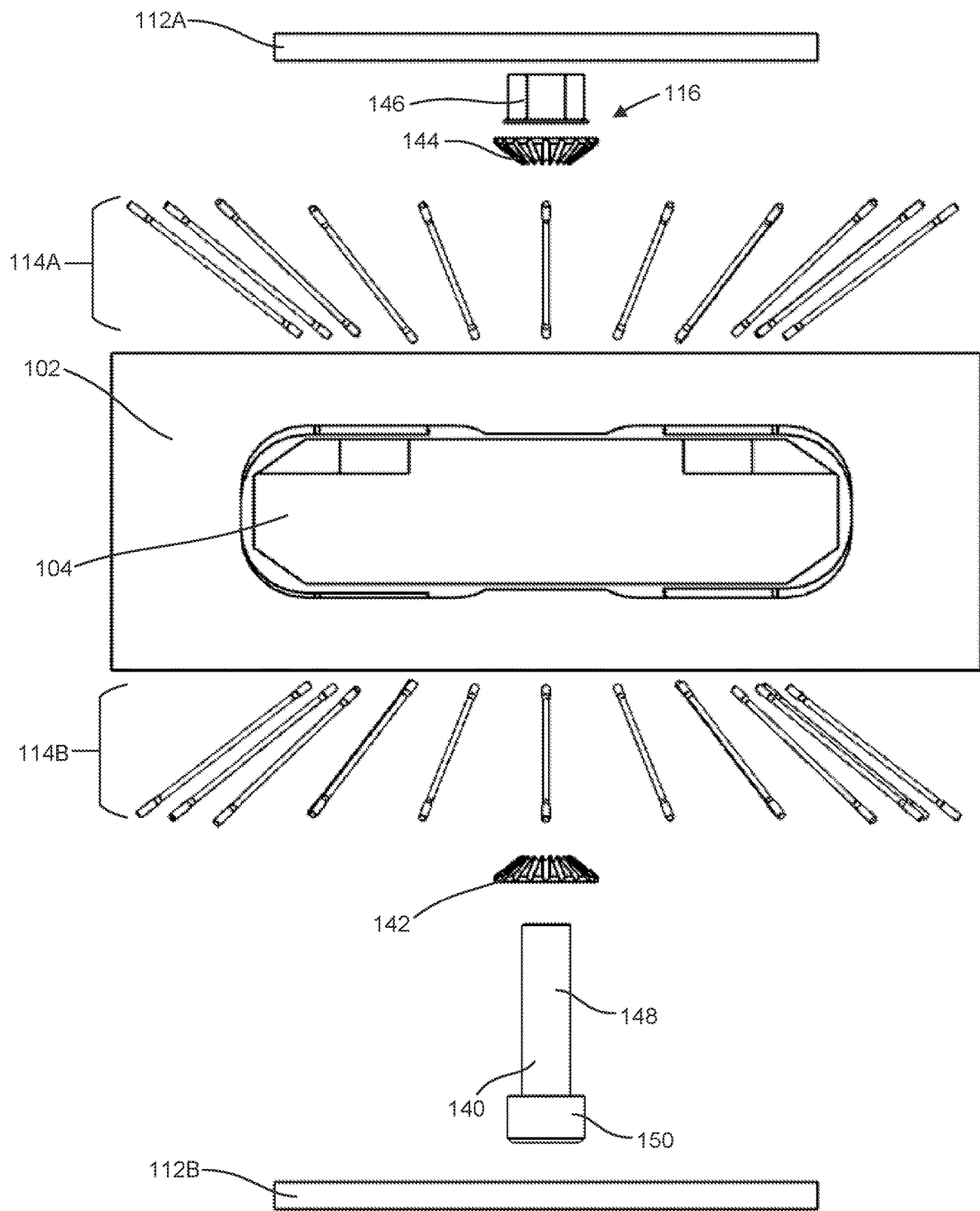
FIG. 7 illustrates a front exploded view of the multi-axis payload isolation device of FIG. 1.

Shape memory alloys can be used for the radial supports in the flexure 110 of the multi-axis payload isolation device 100 illustrated in FIGS. 1-3B and 5A-5C. The assembly of the multi-axis payload isolation device 100 is discussed with reference to FIGS. 6-8B. FIG. 6 illustrates an isometric exploded view of the multi-axis payload isolation device 100. FIG. 7 illustrates a front exploded view of the multi-axis payload isolation device 100. With reference to FIGS. 1-7, when the multi-axis payload isolation device 100 is assembled, the payload mount base 104 can be disposed inside the interior cavity 109 of the housing 102, such that the opening 118 in the payload mount base 104 is substantially in alignment with the opening 111 formed in the housing 102. With the payload mount base 104 disposed within the housing 102, the flexure 110 can interface with both the housing 102 and the payload mount base 104 through the openings 111 and 118.

Each of the plurality of radial supports 114A and 114B can facilitate interface between the housing 102 and the payload mount base 104. For example, the anchoring rings 112A and 112B can receive each of the plurality of radial supports 114A and 114B in the cavities 138A and 138B formed in the anchoring rings 112A and 112B. The housing 102 can receive each of the plurality of radial supports 114A and 114B in the grooves 128A and 128B formed radially around the opening 111 in the housing 112. With each of the plurality of radial supports 114A and 114B disposed in the cavities 138A and 138B of the anchoring rings 112A and 112B and disposed in the grooves 128A and 128B, the anchoring rings 112A and 112B can be removably interfaced with the interface surfaces 124A and 124B in recesses 122A and 122B via one or more coupling means, for example, fasteners inserted through holes 136A and 136B, As illustrated, each of the radial supports of 114A and 114B can be comprised of a single piece of material, such as a shape memory alloy. It is to be understood that the method of attaching the anchoring rings to the housing 102 is not intended to be limited by this disclosure in any way. The anchoring rings 112A and 112B are operable to support and hold the plurality of radial supports 114A and 114B to the housing 102. The anchoring rings 112A and 112B can clamp and hold ends of each of the plurality of radial supports 114A and 114B in place against the interface surfaces 124A and 124B of the housing 102. The anchoring rings 112A and 112B can also be operable to hold the plurality of radial supports 114A and 114B in place by interference fitting, press fitting, welding, adhering, or any other method of attachment, within the cavities 138A and 138B formed in the anchoring rings 112A and 112B. The method of holding the plurality of radial supports 114A and 114B to the housing 102 with the anchoring rings 112A and 112B is not intended to be limited by this disclosure in any way.

As described above, the anchoring rings 112A and 112B are operable to support and hold the plurality of radial supports 114A and 114B to the housing 102. Furthermore, the central hub 116 is operable to support and hold the plurality of radial supports 114A and 114B to the payload mount base 104. As shown in FIGS. 1-8B, the central hub 116 can comprise a central rod 140, a lower anchor ring 142, an upper anchor ring 144, and a nut 146. The central rod 140 is configured to receive each of the lower anchor ring 142, the upper anchor ring 144, and the nut 146 on a shaft 142 of the central rod 140 with the plurality of radial supports 114B being supported between the lower anchor ring 142 and the payload mount base 104 at the opening 118 of the payload mount base 104. The plurality of radial supports 114A can be supported between the upper anchor ring 144 and the payload mount base 104 at the opening of the payload mount base 104. The nut 146 can couple with an end of the shaft 148 of the central rod 140 and can be fitted tightly to the central rod 140 to tightly hold the plurality of radial supports 114A and 114B in place against the payload mount base 104 at the opening 118 between the nut 146 and a head 150 of the central rod 140. The nut can be coupled to the central rod 140 by threads on the nut 146 and corresponding threads on the rod 140, or by press fitting, interference fitting, by cotter pins, spring pins, welding, adhesive, or other known methods for attaching members to a rod. The method of attaching nut 146 to the rod 140 is not intended to be limited by this disclosure in any way. Although it is preferable that the nut be removably fixed to the rod to facilitate replacement of parts, such as radial supports, in the flexure device necessitated by breakage, failure, wear, or other events.

Figure 8A:
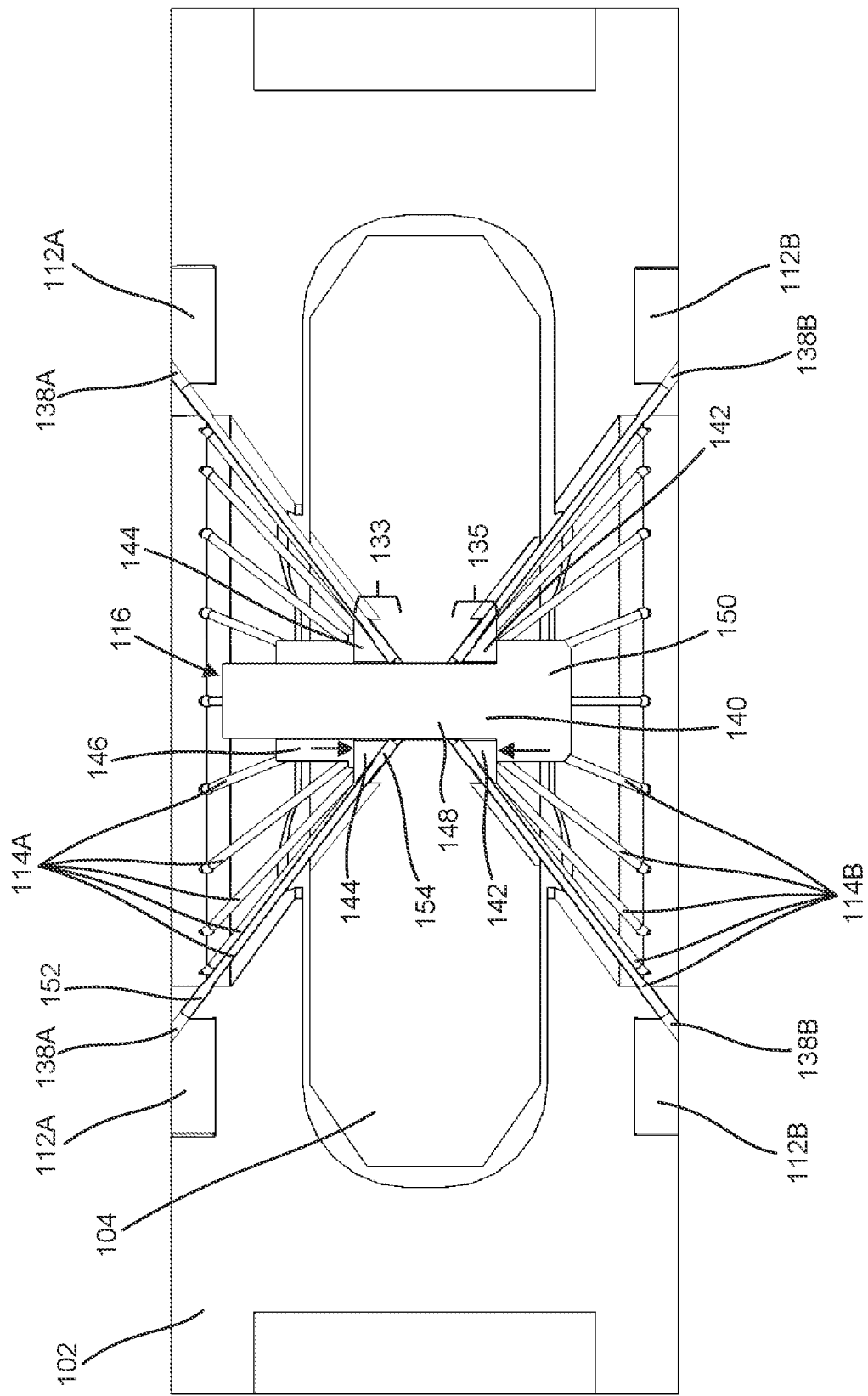
FIG. 8A illustrates a cross-sectional view of the multi-axis payload isolation device of FIG. 1, taken along line AA shown in FIG. 3.

FIG. 8A illustrates a cross sectional view of the multi-axis payload isolation device 100 taken along line AA shown in FIG. 3A. As illustrated, each of the plurality of radial supports 114A are disposed within cavities 138A of anchoring ring 112A, extend from the anchoring ring 112A toward the central hub 116, and all meet at the central hub 116. Similarly, each of the plurality of radial supports 114B are disposed within cavities 138B of anchoring ring 112B, extend from the anchoring ring 112B toward the central hub 116, and all meet at the central hub 116. Each of the plurality of radial supports 138A and 138B are clamped at one end between one of the anchoring rings 112A and 112B and the housing 102 by attachment of the anchoring rings 112A and 112B to the housing 102 with the radial supports disposed there between. At the opposite end of each of the plurality of radial supports 138A and 138B, specifically at the end of the radial supports at the central hub 16, each of the plurality of radial supports 138A and 138B is clamped between the payload mount base 104 and one of the anchor rings 144 and 142. The nut 146 of the central hub 116 can interface with the shaft 148 of the central rod 140. By tightening of the nut 146 on the rod 140, the anchor rings 144 and 142 are forced closer together on the rod 140 between the nut 146 and the head 150 of the rod 140 to interface with the radial supports 114A and 114B and to securely clamp the radial supports 114A and 114B between the anchor rings 144 and 142 and the payload mount base 104.

Figure 8B:
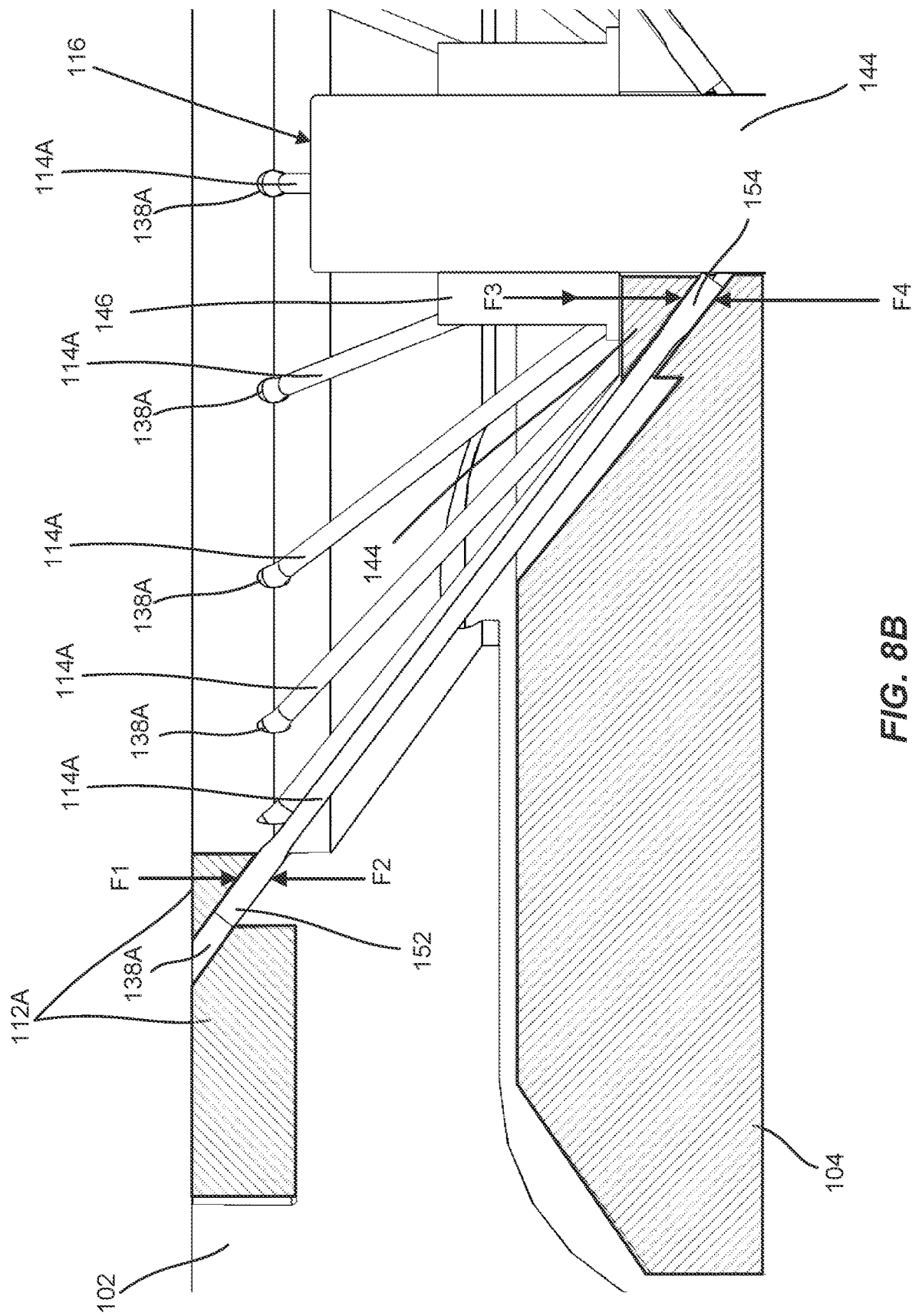
FIG. 8B illustrates a cross-sectional view of the multi-axis payload isolation device of FIG. 1, taken along line AA shown in FIG. 3.

FIG. 8B illustrates a detailed view of a portion of the cross-section of the multi-axis payload isolation device 100 as shown in FIG. 8A, focusing on the connection of one radial support 114A to the housing 102 and the payload mount base 104. As shown in FIG. 8B, a first end 152 of a radial support 114A is clamped in a position disposed in cavity 138A and in between the anchoring ring 112A and the housing 102. Forces F1 and F2 represent forces acting on the radial support 114A by the anchoring ring 112A and the housing 102 to clamp the radial support 114A in place. Additionally, as shown the end 152 of the radial support 114A can be wider than other areas of the radial support 114A. The wider end 152 can allow the radial support 114A to be inserted into cavity 138A of the anchoring ring 112A and can cause an interference or press fit between the cavity 138A and the end 152 of the radial support 114A. In a case where the end 152 is wide enough to cause interference between the radial support 114A and the cavity 138A, the radial support 114A can further be held in place by the fit in addition to the clamping forces.

A second end 154 of the radial support 114A can be clamped between the anchor ring 144 of the central hub 116 and the payload mount base 104. The nut 146, through tightening on the central rod 144, can exert a force F3 downward on the anchor ring 144. The anchor ring 144 can then exert a force F3 downward on the end 154 of the radial support 114A. The payload mount base 104 also exerts and equal and opposite force F4 on the end 154 of the radial support 114A to clamp the radial support 114A in place at the central hub 116. Although FIG. 8B specifically illustrates the anchoring configuration of one radial support 114A, it is to be appreciated that each of the plurality of radial supports 114A can be clamped to the payload mount base 104 and the housing 102 using the same configuration illustrated in FIG. 8B. Furthermore, the plurality of radial supports 114B can also be clamped to the housing 102 and the payload mount base 104 using a similar configuration of anchoring ring 112B and anchor ring 142 on the rod 140. However, instead of the nut 146 providing a downward force on the anchor ring, in the case of the plurality of radial supports 114B, the head 150 of the rod 140 is pulled upward by the tightening of the nut 146. The upward motion of the head 150 exerts a force upward against the anchor ring 142 which then exerts the force upward against the radial support 114B. A reaction force from the payload mount base 104 presses downward against the radial support 114B to clamp the radial support between the payload mount base 104 and the anchor ring 142.

Figure 9:
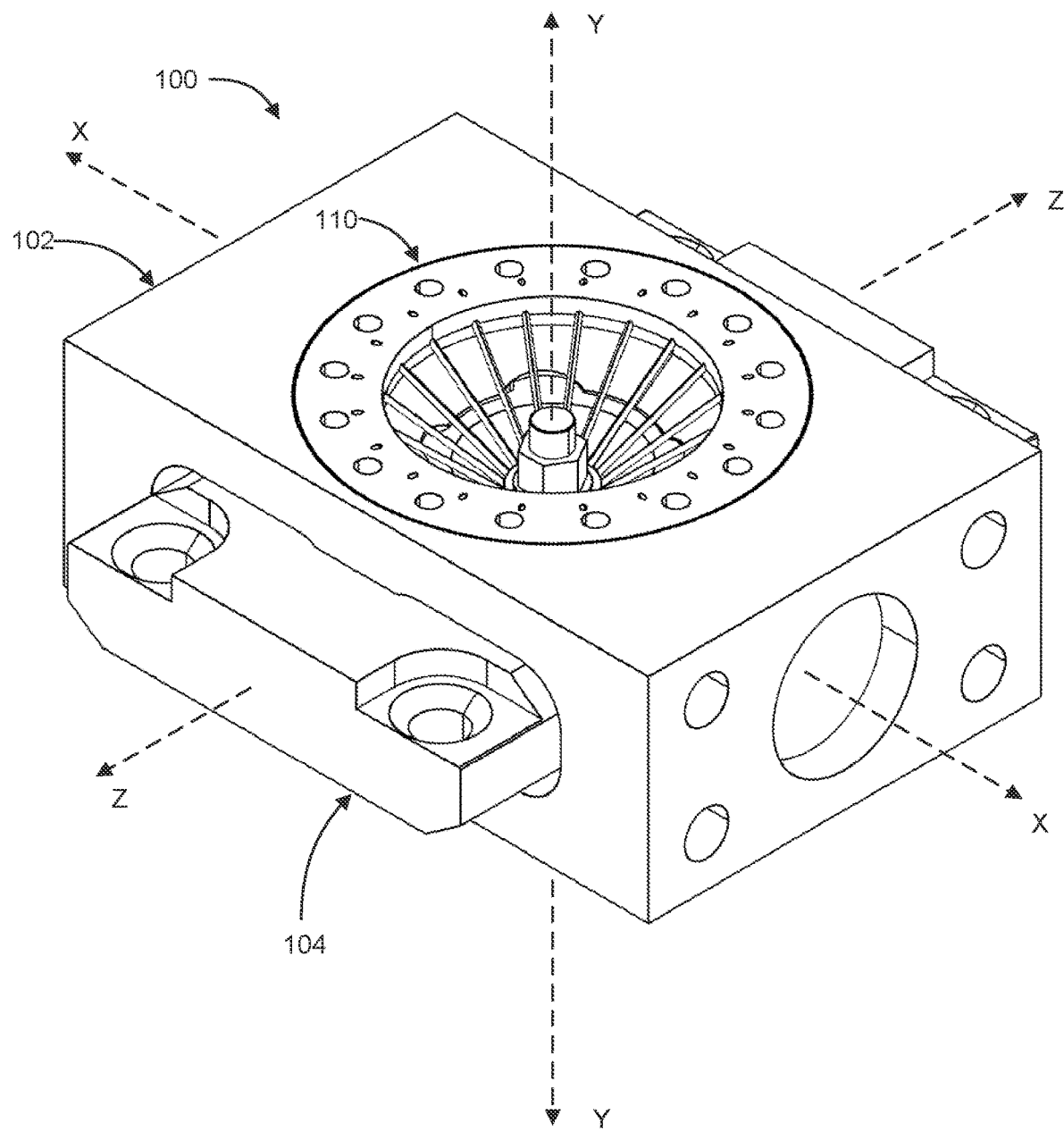
FIG. 9 illustrates an isometric view of the multi-axis payload isolation device of FIG. 1 with axes of translation and rotation noted thereon.

With the flexure 110 supporting the payload mount base 104 within the interior cavity 109 of the housing 102, the payload mount base 104 is suspended and supported by the radial supports 114A and 114B of the flexure 110. The flexure 110 provides isolation for the payload mount base 104 by constraining the movement of the payload mount base 104 in a plurality of degrees of freedom, specifically in translation. For example, the payload mount base 104 is provided with high translational stiffness by the radial supports 114A and 114B of the flexure 110, causing the payload mount base 104 to be substantially constrained from moving in translation along any of the X axis, the Y axis, and the Z axis, as shown in FIG. 9. The unique material properties of shape memory alloys used in the flexure 110 provide high deflection without non-recoverable and/or permanent yielding for a given tensile strength of the shape memory alloy material, when compared to other materials, to absorb shock loads and vibrations that would potentially cause translation of the payload mount base 104 along the X, Y, and/or Z axes. Accordingly, the flexure 110 supporting the payload mount base 104 can act as a shock absorber and absorb impacts, vibrations, and other movements before said movements adversely affect the payload mount base 104 and the payload mounted to the base 104 in translational directions without causing failure of the flexure 110 or any radial supports 114 thereof. Therefore, the payload mount base 104 is isolated from and supported through outside movements acting on the system with sufficient strength to prevent failure of the flexure or the radial supports.

Additionally, the material properties of the shape memory alloys used to make the radial supports 114A and 114B also act to allow some desired amount rotation of the payload mount base 104 within the cavity 109 of the housing 102 about the X, Y, and/or Z axes. In other words, the design provides a rotational flexibility that is high enough to allow rotation of the payload mount base 104 and to adequately absorb and correct vibrations, movements, and loads on the payload mount base 104 in rotational directions. In other words, translation of the payload mount base 104 is prevented by high translational stiffness of the flexure. But some rotation of the payload mount base 104 is allowed about the X, Y, and Z axes by low rotational stiffness provided by the flexure 110. Therefore, the flexure 110 of the multi-axis payload isolation device 100 provides isolation and support to the payload mount base 104 in translational directions within the housing (e.g., translation along the X, Y, and Z axes) and provides adequate rotation of the payload mount base 104 about the X, Y, and Z axes needed for operation and support of the payload on the payload mount base 104.

Figure 10:
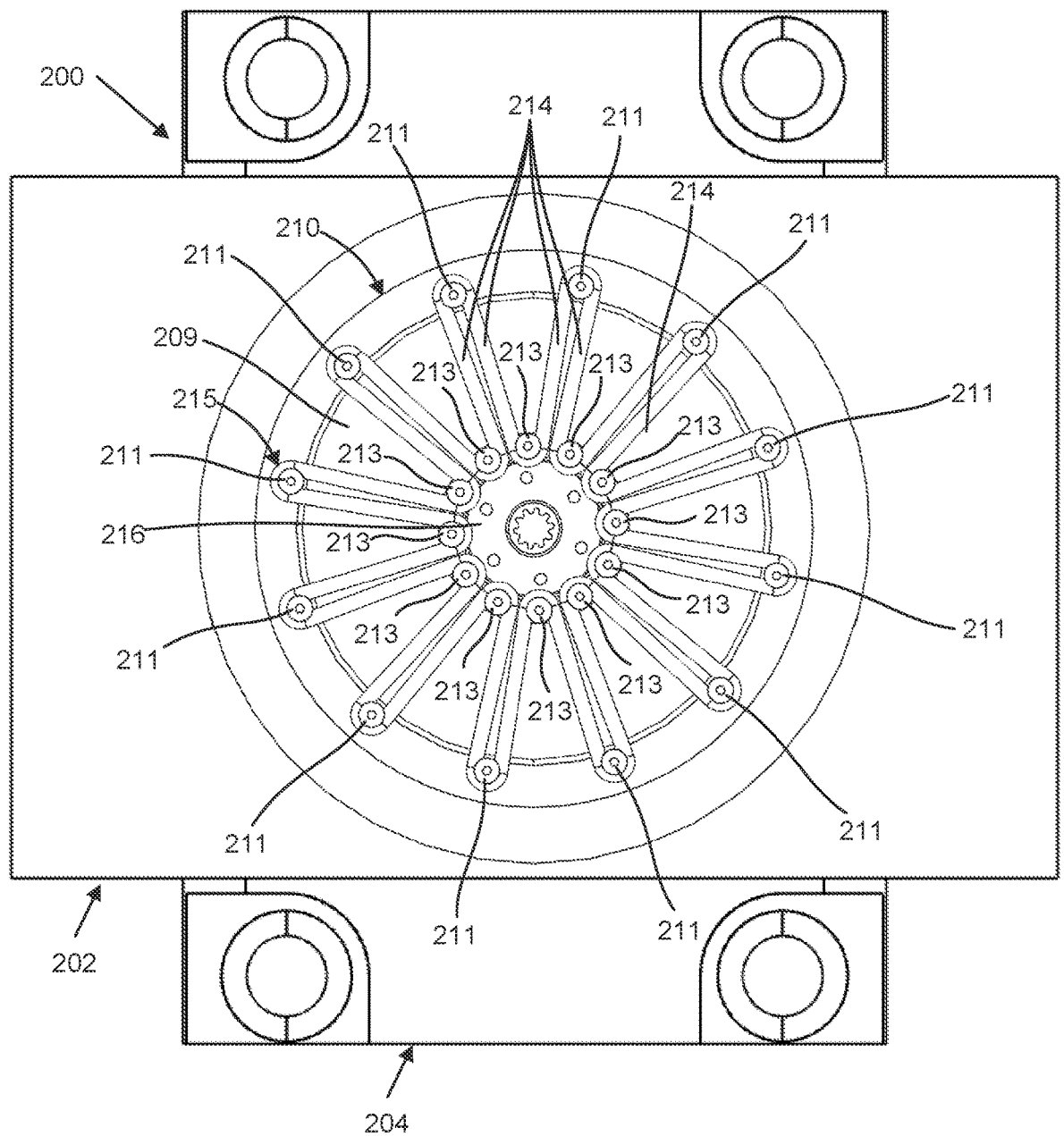
FIG. 10 illustrates a top view of a multi-axis payload isolation device in accordance with at least one example of the present disclosure.

Alternative configurations exist for the multi-axis payload isolation device. For example, FIG. 10 illustrates a multi-axis payload isolation device 200 in accordance with an example of the present disclosure. Similar to device 100, multi-axis payload isolation device 200 can include a housing 202 and a payload mount base 204 of similar configurations as described with respect to device 100. However, the configuration of the flexure 210 can be different than in device 100. For example, the flexure 210 can comprise a plurality of anchors 211, such as for example a plurality of pins, to anchor radial supports comprised of a superelastic shape memory alloy to the housing 202. The anchors 211 can be radially disposed around an opening 209 formed in the housing 204. A common hub 216 can be attached or formed on the payload mount base 204. The common hub 216 can comprise a plurality of anchors 213 that act as anchors and are radially disposed around a perimeter of the common hub 216 and the common hub 216 can be disposed and suspended in the opening 209 of the housing 202. The anchors 213 can anchor the radial supports/shape memory alloy to the common hub 216

The flexure 210 can further include a plurality of radial supports 214 that are made of a superelastic shape memory alloy. In the flexure 210, a plurality of the radial supports 214 can collectively be formed of the same piece of material of shape memory alloy (i.e., the radial supports 214 can be formed from an elongate wire). As shown in FIG. 10 a single piece of shape memory alloy 215 can be used for all of the radial supports 214. As shown and identified in FIG. 10, each span of the shape memory alloy from the housing 202 to the common hub 216 can be a single radial support or spoke. The single piece of shape memory alloy 215 can be a continuous wire that is wrapped around the anchors 211 and the anchors 213, alternating between wrapping around anchors 211 on the housing 202 and anchors 213 on the common hub 216. The alternating wrappings and spans of the shape memory alloy 215 can create or form the plurality of radial supports 214, as shown in FIG. 10. One potential advantage to this variant of the design is the ability to preload the continuous wire piece or pieces of shape memory alloy. Preloading the shape memory alloy radial supports will all but eliminate non-linear stiffness versus deflection ranges of the design. In other words, separable pieces will be more susceptible to having a large deflection distance per load at very low forces than they will once all the spokes are evenly carrying the load. This design configuration can also be useful for ensuring the spokes/radial supports are carrying a load evenly and are less susceptible to tolerances and clamping.

While FIG. 10 illustrates a single piece of shape memory alloy wire forming all of the radial supports of the plurality of radial supports 214, it is to be understood that any number of pieces of shape memory alloy can be used to form the radial supports 214. For example, a single piece of shape memory alloy can be used to form two radial supports with the alloy being wrapped around a single anchor and ends of the shape memory alloy being fixed to other anchors. Additionally a single piece of a wire or flexible member made of a shape-memory alloy can be used to form three radial supports, or four radial supports, or any number of radial supports as needed or desired. The number of radial supports formed by a single piece of shape memory alloy is not intended to be limited by this disclosure in any way. The cross-sectional shape of the shape memory alloy wire is not intended to be limited in any way by this disclosure. The shape memory alloy wire can have any producible cross-section such as circular, elliptical, square, rectangular, or any others.

Figure 11:
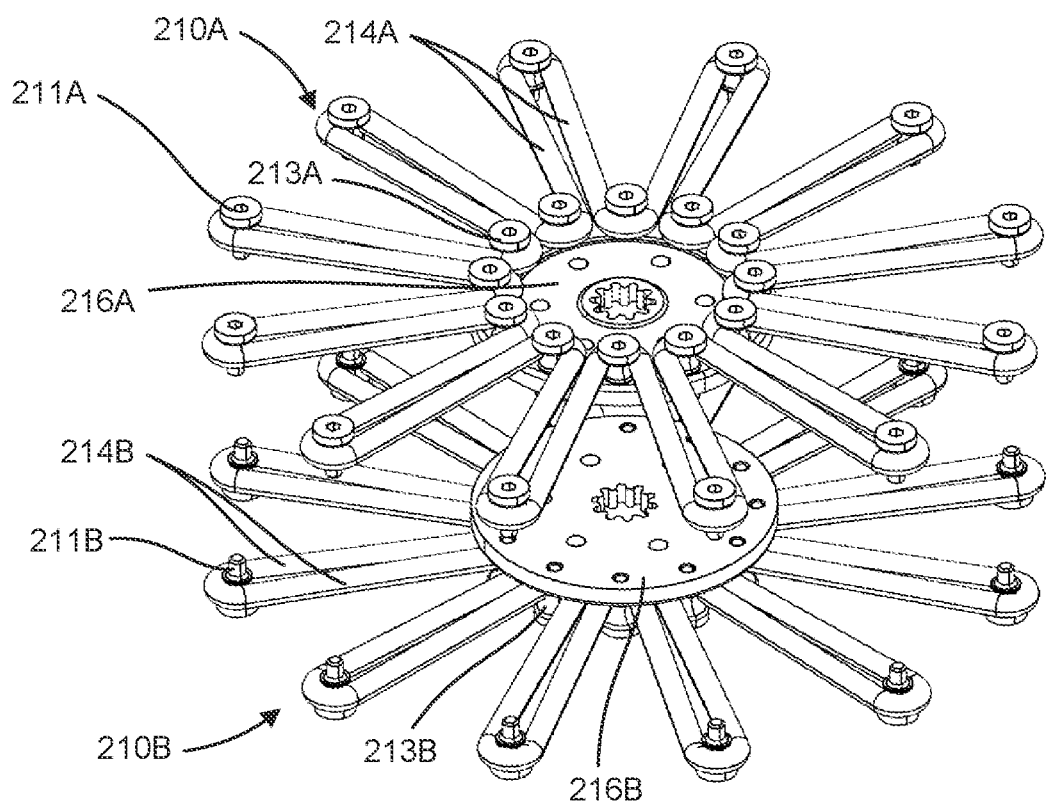
FIG. 11 illustrates an isometric view of a multi-axis flexure in accordance with at least one example of the present disclosure.
Figure 12:
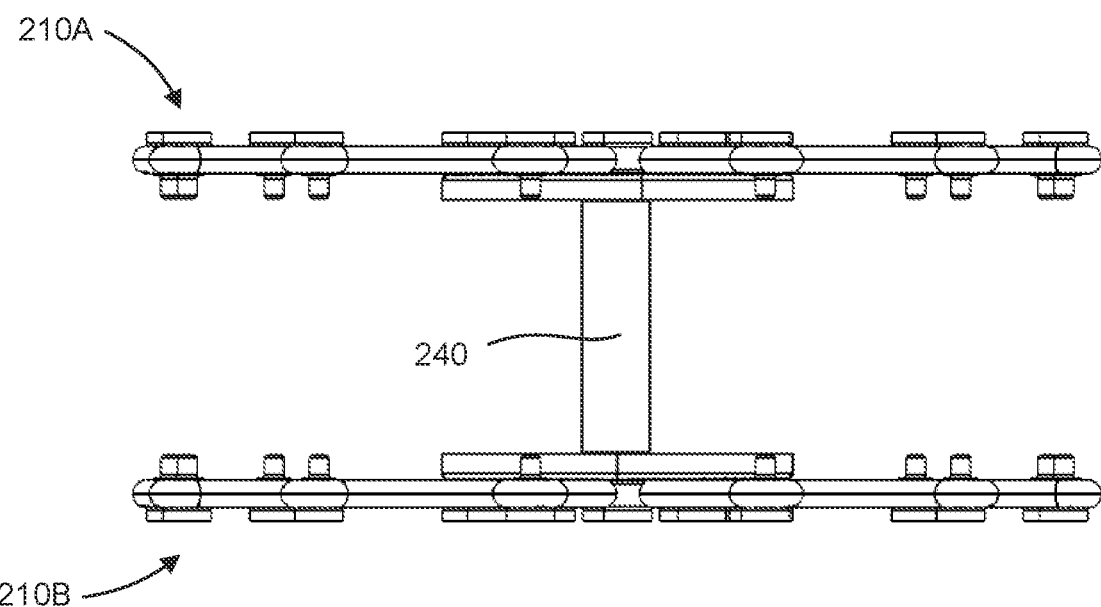
FIG. 12 illustrates a side view of the multi-axis flexure of FIG. 11.
Figure 13A:
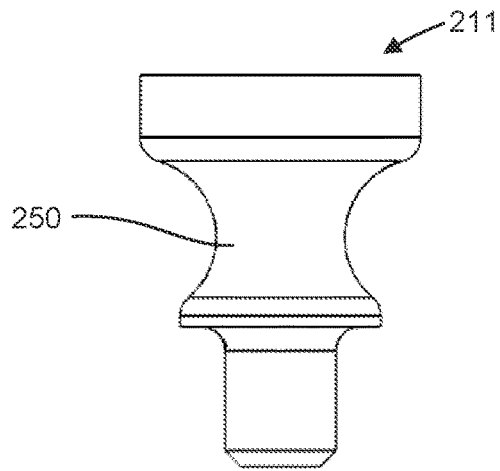
FIGS. 13A-13D illustrate various views of an anchor of the multi-axis flexure of FIGS. 10 and/or 11 in accordance with at least one example of the present disclosure.
Figure 13B:
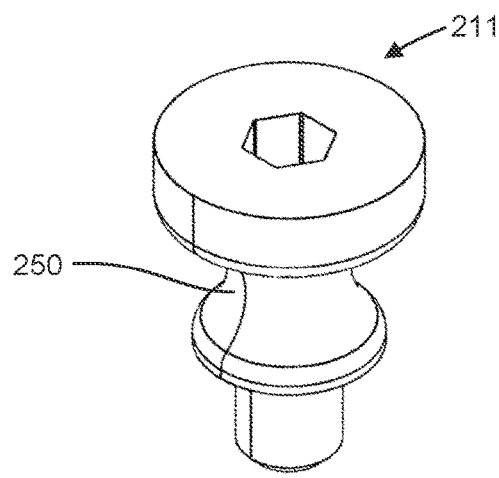
Figure 13C:
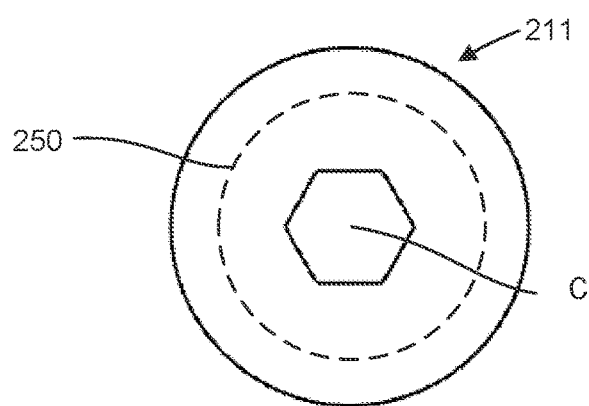
Figure 13D:
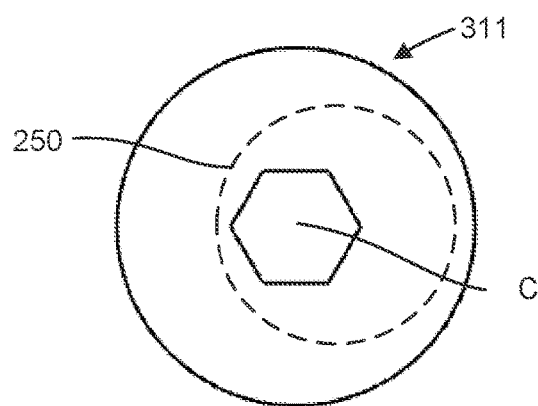

The multi-axis payload isolation device 100, as illustrated in FIGS. 1-9 and described above, can include the flexure 110 that includes two frustoconical flexures 132 and 134. The flexure 210 of the multi-axis payload isolation device 200 similarly can include two flexures that interface with the housing 202 and the payload mount base 204. FIG. 11 illustrates a configuration of two flexures 210A and 210B that make up the flexure 210. With reference to FIGS. 10-12, the flexure 210A can interface with the upper surface of the housing 202 at the outer anchors 211A and the common hub 216A can interface with the upper surface of the payload mount base 204. Similarly, the flexure 210B can interface with the bottom surface of the housing 202 at the outer anchors 211B and the common hub 216B can interface with the bottom surface of the payload mount base 204. As illustrated, rather than having a frustoconical configuration, the flexures 210A and 210B can each form a configuration where the radial supports 214A and 214B are arranged in a common plane. Nonetheless, it is noted that neither the multi-axis payload isolation device 100 nor the multi-axis payload isolation device 200 are limited to the frustoconical or the common plane configurations of radial supports as shown in the figures. The multi-axis payload isolation device 200 with the alloy wrapped around the anchors can have radial supports in a frustoconical configuration or a common plane configuration. Similarly, the multi-axis payload isolation device 100 with the clamped shape memory alloy radial supports can have radial supports in a frustoconical configuration or a common plane configuration. Furthermore, as shown in FIG. 12, the common hubs 216A and 216B of the flexures 210A and 210B can be connected together by a rod 240 and thereby interface with the payload mount base 204. However, the method of interfacing common hubs 216A and 216B to the payload mount base 204 can be any known method of attachment without limitation.

FIGS. 13A-13D illustrate exemplary configurations of the anchors 211 of the multi-axis payload isolation device 200. The configurations shown can also apply to anchors 213 and any other anchors described herein. As shown in FIGS. 10-12, anchor 211 can comprise a wire support surface 250 that receives the shape memory alloy wrapped alternately around anchors 213 and 211. The surface 250 supports the wire and holds the wire in position to provide tension to the radial supports 214. As shown in top view FIG. 13C, the wire support surface 250 can be circular in cross-section and can be concentric with a center of rotation C of the anchor 211. In an alternate configuration shown in top view FIG. 13D, the wire support surface 350 of the anchor 311 can also be eccentric with respect to the center of rotation C. Anchor 311 can be any one or more of the anchors 211A and 211B on the housing 202 and/or the anchors 213A and 213B on common hubs 216A and 216B. The eccentric shape of the wire support surface 350 is such that turning of the one or more anchors having the eccentric shape facilitates tightening or loosening of the radial supports 214A and/or 214B by stretching the shape memory alloy further from a center of the device 200, thereby increasing or decreasing tension on the radial supports made of the shape memory alloy.

Figure 14:
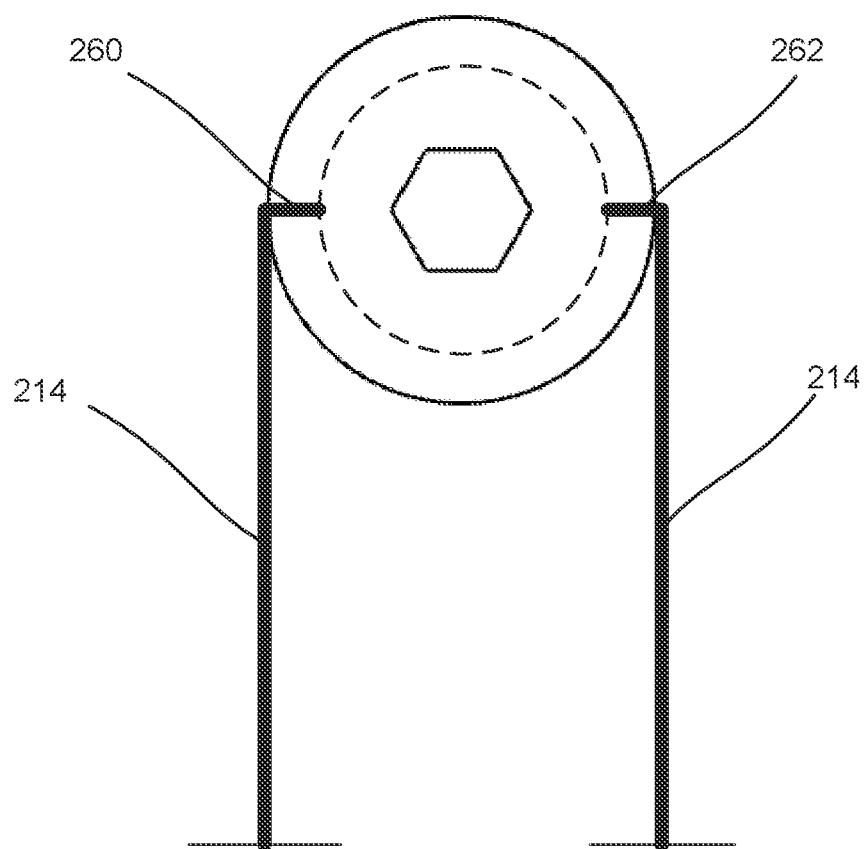
FIG. 14 illustrates a top view of an anchor engaged with a shape memory alloy wire in accordance with at least one example of the present disclosure.

The shape memory alloy used to form the radial supports 214 need not be a fully continuous wire or flexible member made of a piece of shape-memory alloy. For example, as shown in FIG. 14, a break can be formed in the shape memory alloy such that a piece of a wire or flexible member made of a shape-memory alloy can include a first and second end that may or may not be connected to each other. The first end 260 can be fixedly held or connected to an anchor 211 or 213. The second end 262 can also be fixedly held or connected to an anchor 211 or 213. The first end 260 and the second end 262 can be connected to the same anchor or to different anchors. By connecting the ends to the anchor, tension can be added to or removed from the non-continuous wire of shape memory alloy and radial supports by turning the anchor to wind or unwind the shape memory alloy/radial supports around the anchor. Therefore, the radial supports can be tensioned or loosened as desired. Each radial support can have an end connected to an anchor, such that each radial support can be individually tensioned or loosened.

Figure 15:
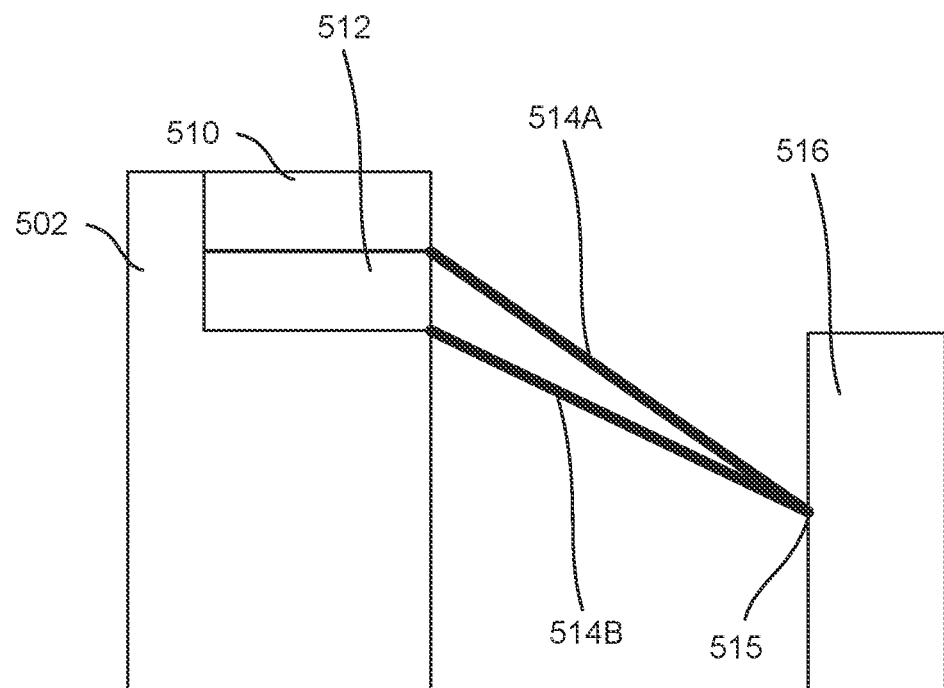
FIG. 15 illustrates a partial side view of a multi-axis payload isolation device in accordance with at least one example of the present disclosure.
Figure 16:
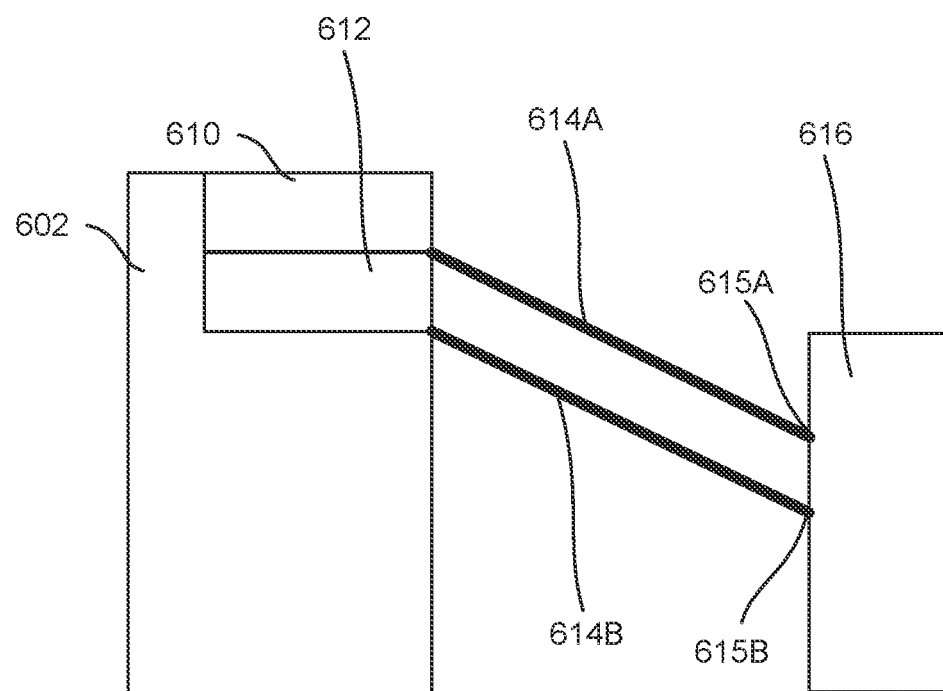
FIG. 16 illustrates a partial side view of a multi-axis payload isolation device in accordance with at least one example of the present disclosure.

In addition to the configurations already shown, an alternative configuration can be where multiple flexures are stacked on top of each other to connect to a common hub. FIGS. 15 and 16 illustrate simplified cross sections similar to FIG. 8B. As shown in FIG. 15, a housing 502 can receive two anchoring rings 510 and 512 stacked on top of each other. The anchoring ring 512 can clamp a radial support 514B against the housing 502 and the anchoring ring 510 can clamp the radial support 514A against the anchoring ring 512. Each of the radial supports 514A and 514B can connect at a common hub 515 on central hub 516. Although the connection and damping of the radial supports 514A and 514B by the anchoring rings 510 and 512 and the common hub 515 are not specifically shown, it is to be understood that the teachings and configurations described elsewhere in this disclosure, as well as any known methods of attachment, can be used to fix the radial supports 514A and 514B in place. FIG. 16 illustrates an alternate configuration where two anchoring rings 610 and 612 are used to clamp radial supports 614A and 614B to the housing 602. In contrast to FIG. 15, the radial supports 614A and 614B are connected to central hub 616 at different hubs 615A and 615B that disposed or stacked on each other. It is to be understood that any number of radial supports can be connected as shown in the configurations shown in FIGS. 15 and 16. A plurality of radial supports can be connected in a frustoconical configuration or in a common plane configuration in a manner radially surrounding the central hub and an opening formed in the housing, such as is shown in FIGS. 1 and 6-8B.

As shown above and in the accompanying figures, a flexure 110 can be used as part of a multi-axis payload isolation device 100 to support a payload mount base 104 configured to support a payload. In the configuration of multi-axis payload isolation device 100, as described above, the payload can be mounted to payload mount base 104, such that the payload is supported on or outside of the flexure 110 and housing 102.

Figure 17:
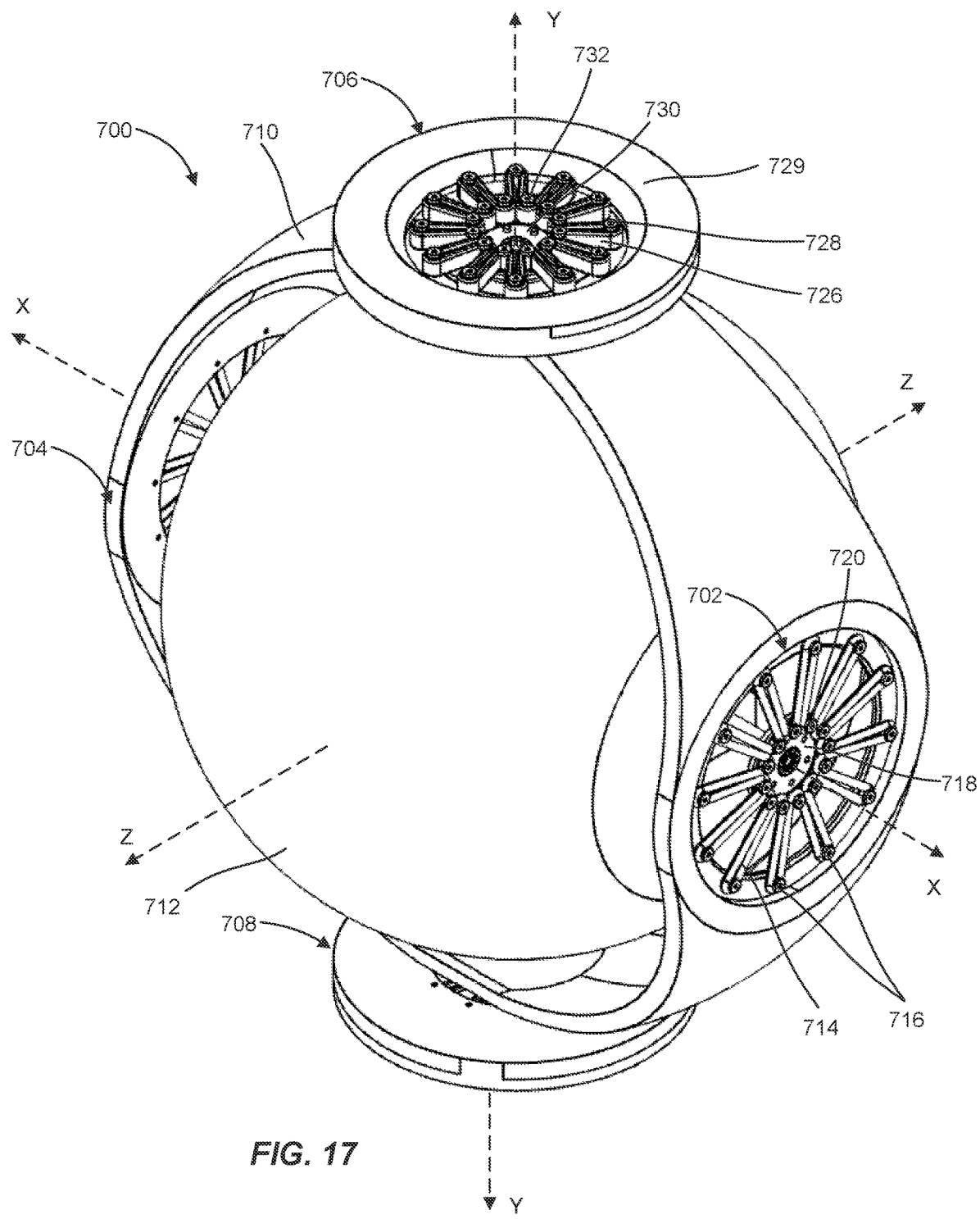
FIG. 17 illustrates an isometric view of a multi-axis payload isolation device in accordance with at least one example of the present disclosure.
Figure 18A:
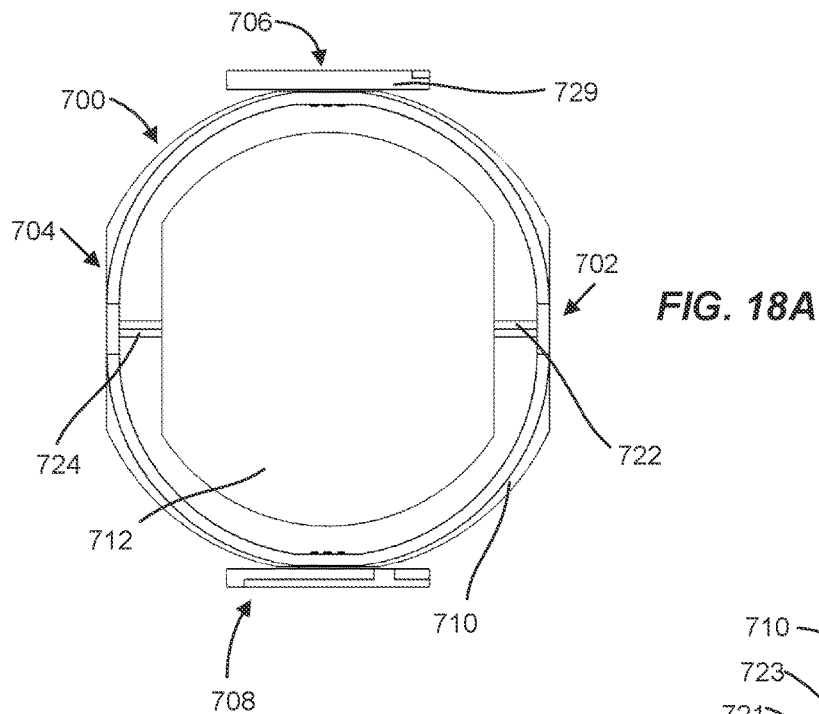
FIGS. 18A-18C illustrate a front, side, and top/bottom view, respectively, of a multi-axis payload isolation device in accordance with at least one example of the present disclosure.

Other configurations are possible where the payload is supported within a housing and multiple flexures are disposed outside of the payload. For example, FIG. 17 illustrates an isometric view of a multi-flexure payload isolation device 700 comprising a plurality of multi-axis flexures for supporting a payload inside of a housing, wherein the payload, the housing and the multiple flexures form a multi-flexure payload isolation system for isolating a payload from outside movements. Two different options for tuning of stiffness are shown as examples of many possible tuned stiffness levels. In FIG. 17 the flexures 702 and 704 are at a larger diameter to allow a larger maximum "pitch" angle of flexure. By going to the larger diameter, as in the flexures 702 and 704, this will also allow the flexure to flex in smaller angles for "yaw" and "roll". Although not the configuration shown in FIG. 17, if the rotation centers for yaw and roll need to be at the center of the payload, the radial supports can be angled conically to intersect at a common center rotation point, wherein the flexures 702 and 704 can allow a larger amount of translation isolation in the X axis (axial) but will be much stiffer in the Y and Z axis (radial) since some of the radial supports will always be in tension. The top and bottom flexures (706 and 708 in FIG. 18B) can be at a smaller diameter and higher radial support thickness then the flexures 702 and 704. This can still allow flexibility about one axis (which is the roll axis in this orientation, although to a smaller maximum angle deflection than the larger diameter variant). However, it will limit flexibility in all other five degrees of freedom, which can be desirable for some servo applications.

Regardless of whether a given degree of freedom is desired to be combined or separated, cross coupling of various axis can be stacked and tuned as desired. One advantage this has over conventional bearings is that there is no friction, which is a substantial issue for precision pointing servos. Another is the ability to provide rotation/flexibility without being damaged during high shock loads. As long as the joint flexure remains low enough to avoid hitting hard stops during performance environmental requirements, it is not detrimental to momentarily lose servo control during high shock events. Bearings tend to Brinelle at high shock events (in addition to being single axis rotation only joints). If larger maximum rotational flexure angles are needed flexures can be stacked in series with each other.

As shown, the multi-flexure payload isolation device 700 can include a plurality of multi-axis flexures 702, 704, 706, and 708. The device 700 can further include a housing 710 disposed outside of and around a payload 712 (i.e., the payload 712 can be within an envelope boundary of the housing 710), The housing 710 can be a ring as shown, or can be a frame any other shape configured to at least partially surround a perimeter of a payload 712. Each of the multi-axis flexures 702, 704, 706, and 708 can be configured in accordance with any one of the multi-axis flexure examples described herein. For example, each of the flexures 702, 704, 706, and 708 shown supported by the housing 710 can be configured the same or similarly as the multi-axis flexure 210 described above and shown in FIG. 10. As shown in FIG. 17, side or first flexure 702 can include a plurality of radial supports 714 made of one or more pieces of shape memory alloy, one or more anchors 716 that can anchor the radial supports 714 to a support surface 723 of the housing 710, and a common hub 718 suspended in an opening 721 of the housing 710, wherein one or more anchors 720 anchor the radial supports 714 to the common hub 718. The side or second flexure 704, supported by the housing 710 opposite to the side flexure 702, can be a same type of flexure with a same configuration as the flexure 702. The common hubs of the flexures 702 and 704 can be respectively attached to support bars 722 and 724 (e.g., isolation bars) shown in FIG. 18A. The support bars 722 and 724 can be fixed to the payload 712 to support and suspend the payload 712 within the housing 710. The method of attachment between the support bars 722 and 724 and the common hubs 718 is not intended to be limited in any way by this disclosure. The method of attachment between the support bars 722 and 724 and the payload 712 is not intended to be limited in any way by this disclosure.

The top or third flexure 706 can include a plurality of radial supports 726 made of one or more pieces of shape memory alloy, one or more anchors 728 that can anchor the radial supports 726 to a support surface 733 of the radial support plate 729, and a common hub 730 attached to the housing 710. An opening 731 can be formed in the support surface 733 of the radial support plate 729 and the common hub 730 can be disposed in the opening 731. One or more anchors 732 can anchor the radial supports 726 to the common hub 730. Therefore, the radial support plate 729 can be separate from the housing 710 and can be connected to the housing 710 by the plurality of radial supports 726 being attached to both the radial support plate 729 and the common hub 730 attached to the housing 710 in opening 731. The radial support plates 729 of the flexures 706 and 708 can be fixed to any type of structure, such as a vehicle, a chassis, a stationary structure, or a mobile mount by any method without limitation. Accordingly, the housing 710, including the payload 712, can be suspended and supported by the flexures 706 and 708 and can isolate the housing 710 and payload 712 from the outside shocks, impacts, and vibrations. The bottom or fourth flexure 708, disposed on the housing 710 opposite to the top flexure 706, can be a same type of flexure with a same configuration as the top flexure 706. The method of attachment between the common hubs 730 and the payload housing 710 is not intended to be limited in any way by this disclosure.

Figure 18B:
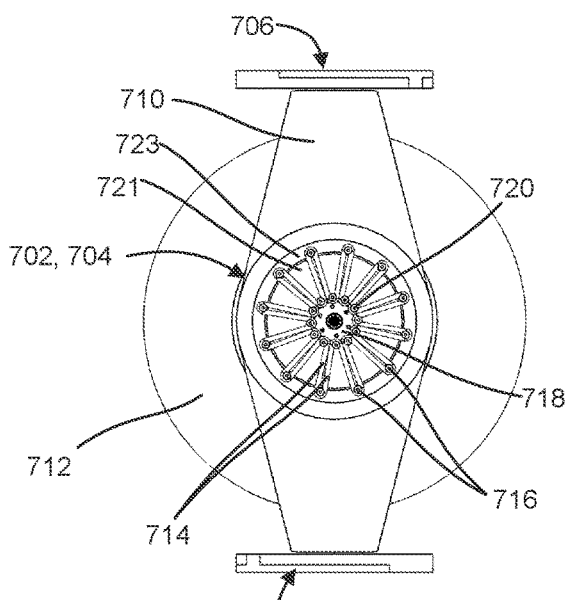
Figure 18C:
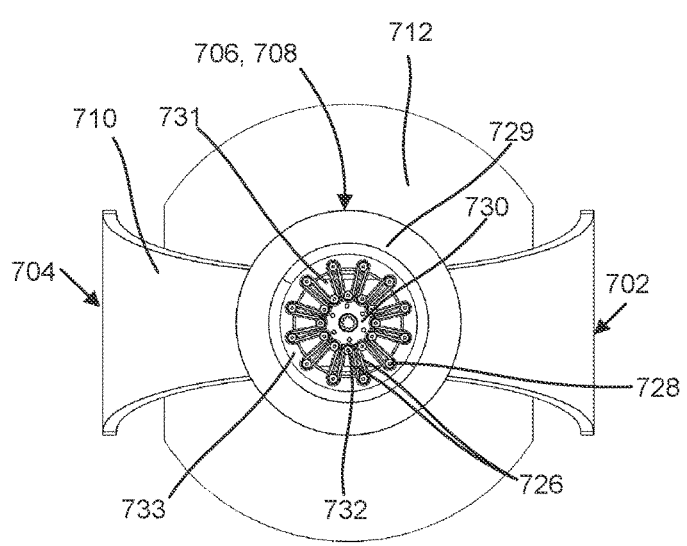

FIGS. 18B and 18C respectively illustrate a side view and a top/bottom view of the multi-flexure payload isolation device 700. It is to be understood that the side view illustrated is the same and symmetrical whether viewing the device from the side of flexure 702 or flexure 704. Therefore, to avoid identical figures showing a same configuration, a single figure is used to represent both views. Additionally, the top/bottom view of FIG. 18C is the same whether viewed from the top flexure 706 or the bottom flexure 708. Therefore, to avoid identical figures showing a same configuration, a single figure is used to represent both views.

With the flexures 702, 704, 706, and 708 supporting the payload 712 within the housing 710, the payload 712 is suspended and supported by the radial supports 716 of the flexures 702 and 704. The flexures 702 and 704 provide isolation for the payload 712 by constraining the movement of the payload 712 in translation along the Z and/or Y axes with relatively high stiffness but with lower stiffness in the X axis. The payload 712 is provided with high radial translational stiffness by the radial supports 716 of the flexures 702 and 704, causing the payload 712 to be substantially constrained from moving in translation along the Z and/or Y axes, as shown in FIG. 17. The unique material properties of shape memory alloys used in the flexures 702 and 704 provide high tensile strength to absorb shock loads and vibrations that would potentially cause translation of the payload 712 along the Z and/or Y axes. Accordingly, the flexures 702 and 704 supporting the payload 712 can act as a shock absorber and absorb impacts, vibrations, and other movements before said movements adversely affect the payload 712 in translational directions without causing failure of the flexures 702 or 704 or any radial supports 714 thereof. Therefore, the payload 712 is isolated from and supported through outside movements acting on the system with sufficient strength to prevent failure of the flexure or the radial supports. Similarly, the flexures 706 and 708 supporting the housing 712 also provide stiffness against translation of the housing in the Z and/or Y axes and absorb vibrations and shock loads in the translation directions along the axes, By support and isolation of the housing 710 by flexures 706 and 708, the payload 712 is further supported and prevented from translating along the Z and/or Y axes.

Additionally, the material properties of the shape memory alloys used to make the radial supports 714 and 726 also act to allow some desired amount rotation of the payload 712 within the housing 712 about the Z and/or Y axes (with the X axis being the primary large rotational flexure axis). In other words, the design provides a rotational flexibility that is high enough to allow rotation of the payload 712 and to adequately absorb and correct vibrations, movements, and loads on the payload 712 in rotational directions. Translation of the payload 712 is limited and tuned by high translational stiffness of the flexures 702, 704, 706, and 708. But some rotation of the payload 712 is allowed about the Z and/or Y axes by low rotational stiffness provided by the flexures 702, 704, 706, and 708. Therefore, the flexures 702, 704, 706, and 708 of the multi-axis payload 712 provide isolation and support to the payload 712 in translational directions within the housing (e.g., translation along the Z and/or Y axes) and provide smaller but adequate rotation of the payload 712 about the Z and/or Y axes needed for operation and support of the payload 712. While the support bars 722 and 724 attach the payload to the flexures 702 and 704, it is to be understood that intermediate members, such as a payload mount base, can be attached to the support bars 722 and 724 and the payload itself can be attached to the payload mount base. The payload 712 is not limited to being directly attached to the support bars.

Additionally, the radial supports 714 and 726 can have any of a circular, elliptical, rectangular, square, or other geometric cross section without limitation, and can be formed of any number of pieces of material. Advantages are obtained by using a rectangular cross section because the rectangular cross section can be significantly stiffer than a circular cross section of shape memory alloy, which thereby can limit undesired translational and/or rotational movement of the payload.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims, Numerous modifications and alternative arrangements may be devised without departing from the spirit and scope of the described technology.

What is claimed is:

1. A multi-axis payload isolation device for isolating a payload from outside motions, the device comprising:
   a payload mount base configured to support a payload;
   a housing comprising an interior cavity for receiving and supporting the payload mount base; and
   a flexure comprising:
   a plurality of radial supports made of a superelastic shape-memory alloy that attach the payload mount base to the housing; and
   a common hub configured to connect each of the plurality of radial supports to the payload mount base;
   wherein the plurality of radial supports comprise a first plurality of radial supports that connect the housing to a first side of the payload mount base at the common hub, the flexure further comprising:
   a second plurality of radial supports connecting the housing to a second side of the payload mount base opposite the first side at a second common hub;
   wherein the first plurality of radial supports and the second plurality of radial supports each form a frustoconical configuration extending from the housing to the payload mount base.

2. The multi-axis payload isolation device of claim 1, wherein the flexure provides isolation for the payload mount base in two or more degrees of freedom.

3. The multi-axis payload isolation device of claim 1, wherein the plurality of radial supports collectively form a frustoconical configuration.

4. The multi-axis payload isolation device of claim 1, wherein the plurality of radial supports are arranged in a common plane.

5. The multi-axis payload isolation device of claim 1, wherein two or more radial supports of the plurality of radial supports collectively are comprised of a single piece of the superelastic shape memory alloy.

6. The multi-axis payload isolation device of claim 5,
   wherein the housing comprises a plurality of anchors radially disposed around an opening in the housing;
   wherein the common hub comprises a plurality of anchors radially disposed around a perimeter of the common hub, the common hub being disposed in the opening of the housing; and
   wherein the two or more radial supports comprised of the single piece of the superelastic shape memory alloy are alternately wound around the plurality of anchors of the housing and the plurality of anchors of the common hub to suspend the common hub in the opening of the housing.

7. The multi-axis payload isolation device of claim 6, wherein turning of one or more anchors of the plurality of anchors of the housing, or one or more anchors of the plurality of anchors of the common hub facilitates tightening or loosening of the two or more radial supports.

8. The multi-axis payload isolation device of claim 5, wherein the single piece of superelastic shape memory alloy comprises a continuous wire wrapped around multiple anchors.

9. The multi-axis payload isolation device of claim 6,
   wherein the single piece of superelastic shape memory alloy comprises a non-continuous wire; and
   wherein a first end of the non-continuous wire is attached to one of the anchors of the plurality of anchors of the housing or to one of the anchors of the plurality of anchors of the common hub;
   wherein a second end of the non-continuous wire is attached to one of the anchors of the plurality of anchors of the housing or to one of the anchors of the plurality of anchors of the common hub;
   wherein the non-continuous wire is configured to be tightened or loosened via the attached anchor.

10. The multi-axis payload isolation device of claim 1, wherein each of the plurality of radial supports are comprised of a single piece of the superelastic shape memory alloy.

11. The multi-axis payload isolation device of claim 1, further comprising one or more anchors operable to hold each of the plurality of radial supports to the housing; and
   wherein the common hub comprises one or more anchors operable to hold the plurality of radial supports to the payload mount base.

12. The multi-axis payload isolation device of claim 1, wherein the plurality of radial supports comprise a first plurality of radial supports connecting the housing to the payload mount base at the common hub, the flexure further comprising:
   a second plurality of radial supports connecting the housing to the payload mount base at the common hub.

13. The multi-axis payload isolation device of claim 1, wherein the plurality of radial supports comprise a circular or elliptical shaped cross-section.

14. The multi-axis payload isolation device of claim 1, wherein the plurality of radial supports comprise a square or rectangular shaped cross-section.

15. A multi-axis flexure comprising:
   a plurality of radial supports made of a superelastic shape-memory alloy;
   one or more first anchors configured to support each of the plurality of radial supports and operable to facilitate coupling of the flexure to a housing;
   a common hub configured to support each of the plurality of radial supports and operable to facilitate coupling of the plurality of radial supports to a payload; and
   one or more second anchors configured to support each of the plurality of radial supports and operable to facilitate coupling of the radial supports to the common hub;
   wherein the one or more first anchors comprise a clamp operable to hold each of the plurality of radial supports to the housing; and
   wherein the one or more second anchors comprise a clamp operable to hold each of the plurality of radial supports to the common hub.

16. A multi-axis payload isolation system comprising:
   a payload;
   a multi-axis payload isolation device for isolating the payload from outside motions, the device comprising:
   a payload mount base configured to support the payload;
   a housing comprising an interior cavity for receiving and supporting the payload mount base; and
   a flexure as recited in claim 15
   wherein the payload is attached to the payload mount base.

17. The multi-axis payload isolation system of claim 16, wherein the payload comprises one or more of an imaging device, a sensor, a mapping device, a recording device, and a targeting device.

18. The multi-axis flexure of claim 15, wherein the one or more first anchors comprises a plurality of first anchors configured to anchor the plurality of radial supports to a housing;
   wherein the one or more second anchors comprise a plurality of second anchors radially disposed around a perimeter of the common hub and configured to anchor the plurality of radial supports to the common hub.

19. The multi-axis flexure of claim 15, wherein the plurality of radial supports collectively form a frustoconical configuration.

20. The multi-axis flexure of claim 15, wherein the plurality of radial supports are arranged in a common plane.

21. The multi-axis flexure of claim 15, wherein two or more radial supports of the plurality of radial supports collectively are comprised of a single piece of the superelastic shape memory alloy.

22. The multi-axis flexure of claim 18, wherein the plurality of radial supports are comprised of a single piece of the superelastic shape memory alloy and are alternately wound around the plurality of first anchors and the plurality of second anchors of the common hub.

* * * * *